United States Patent
Matsui et al.

(10) Patent No.: US 8,294,912 B2
(45) Date of Patent: Oct. 23, 2012

(54) IMAGE PROCESSING APPARATUS AND CONTROL METHOD THEREOF

(75) Inventors: Nobuaki Matsui, Kawasaki (JP); Ken Achiwa, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 832 days.

(21) Appl. No.: 12/428,886

(22) Filed: Apr. 23, 2009

(65) Prior Publication Data

US 2009/0279131 A1    Nov. 12, 2009

(30) Foreign Application Priority Data

May 9, 2008    (JP) ................................. 2008-123897

(51) Int. Cl.
*G06F 3/12*    (2006.01)
(52) U.S. Cl. ........................ 358/1.13; 358/1.1; 358/1.15
(58) Field of Classification Search ................. 358/1.15, 358/1.1
See application file for complete search history.

(56) References Cited

U.S. PATENT DOCUMENTS

| | | | |
|---|---|---|---|
| 7,315,388 B2 | 1/2008 | Fujiwara et al. | 358/1.15 |
| 2004/0120593 A1* | 6/2004 | Earl et al. | 382/245 |
| 2006/0182106 A1 | 8/2006 | Fujiwara et al. | 370/389 |
| 2006/0203817 A1 | 9/2006 | Fujiwara et al. | 370/389 |

FOREIGN PATENT DOCUMENTS

| | | |
|---|---|---|
| JP | 2002-300190 | 10/2002 |
| JP | 2002-305622 | 10/2002 |

\* cited by examiner

*Primary Examiner* — King Poon
*Assistant Examiner* — Iriana Cruz
(74) *Attorney, Agent, or Firm* — Fitzpatrick, Cella, Harper & Scinto

(57) ABSTRACT

Conventionally, pixel data are converted into the tile sequence. According to this invention, span information or run-length information during conversion into pixel data from vector data such as a display list converted from a page description language is converted into the tile sequence before rendering into pixel data. This can greatly reduce the amount of data temporarily stored for conversion into the tile sequence.

14 Claims, 28 Drawing Sheets

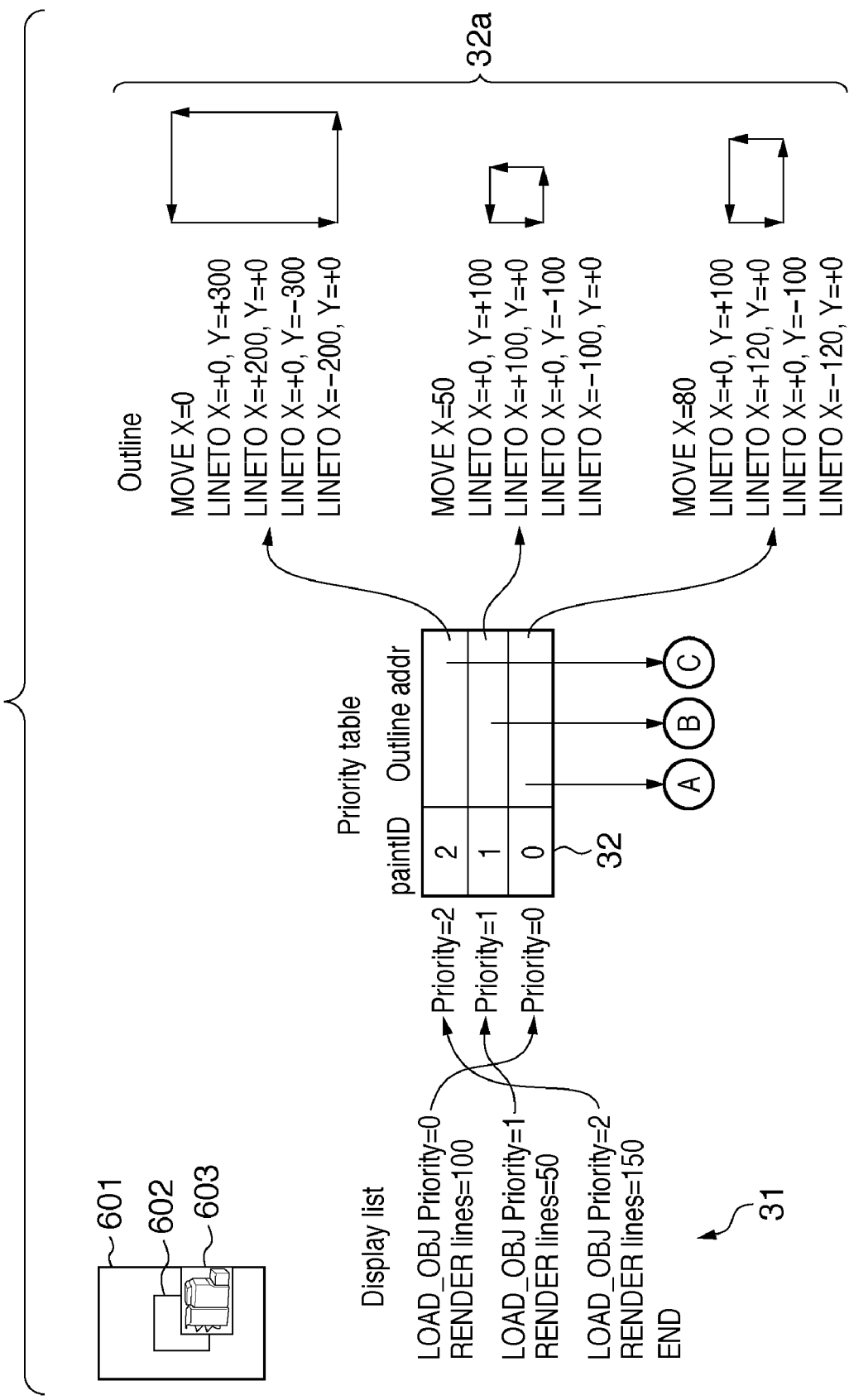

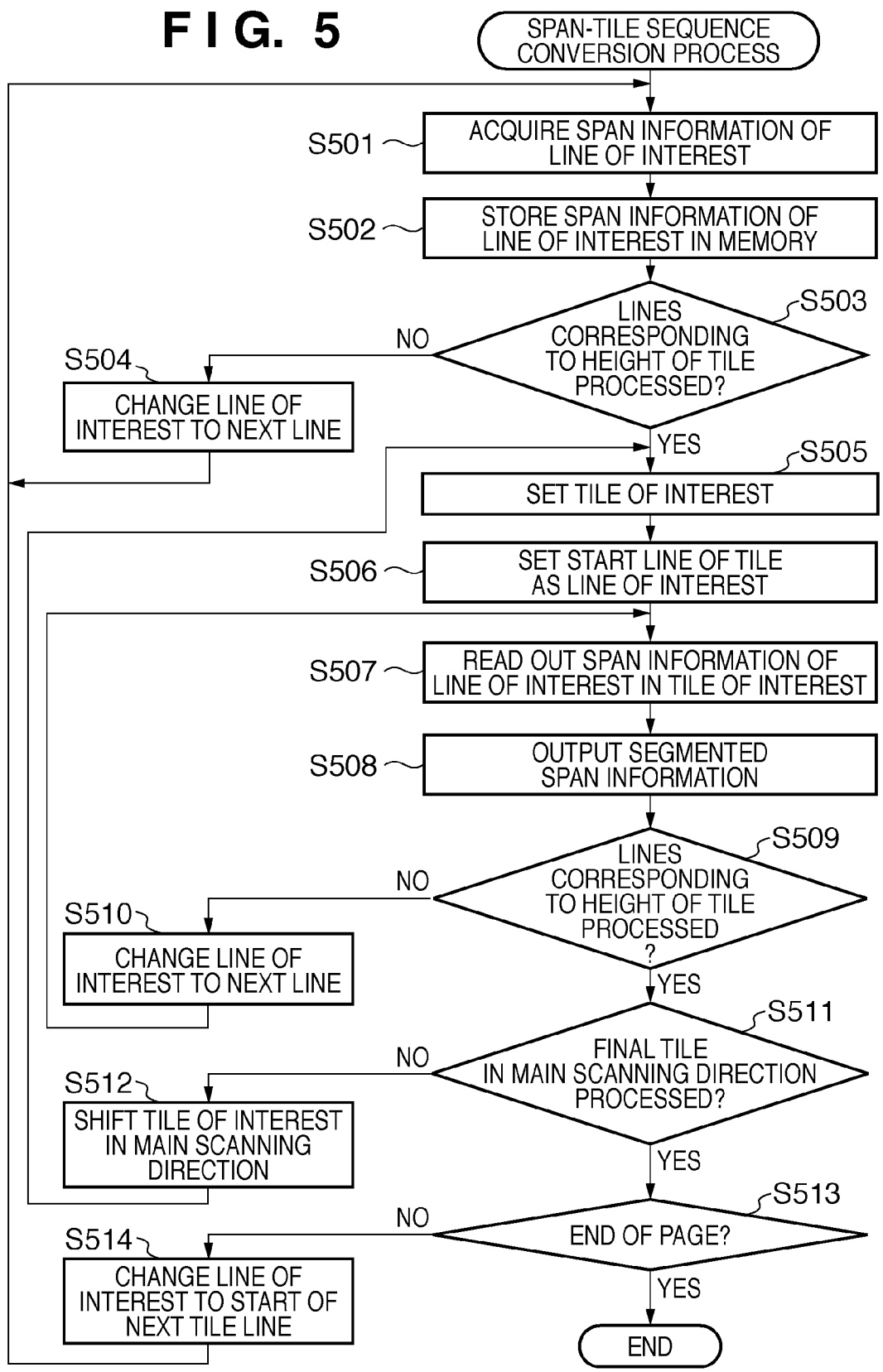

F I G. 6A

| PRIORITY INFO. | CURRENT X COORDINATE | DIRECTION FLAG |
|---|---|---|

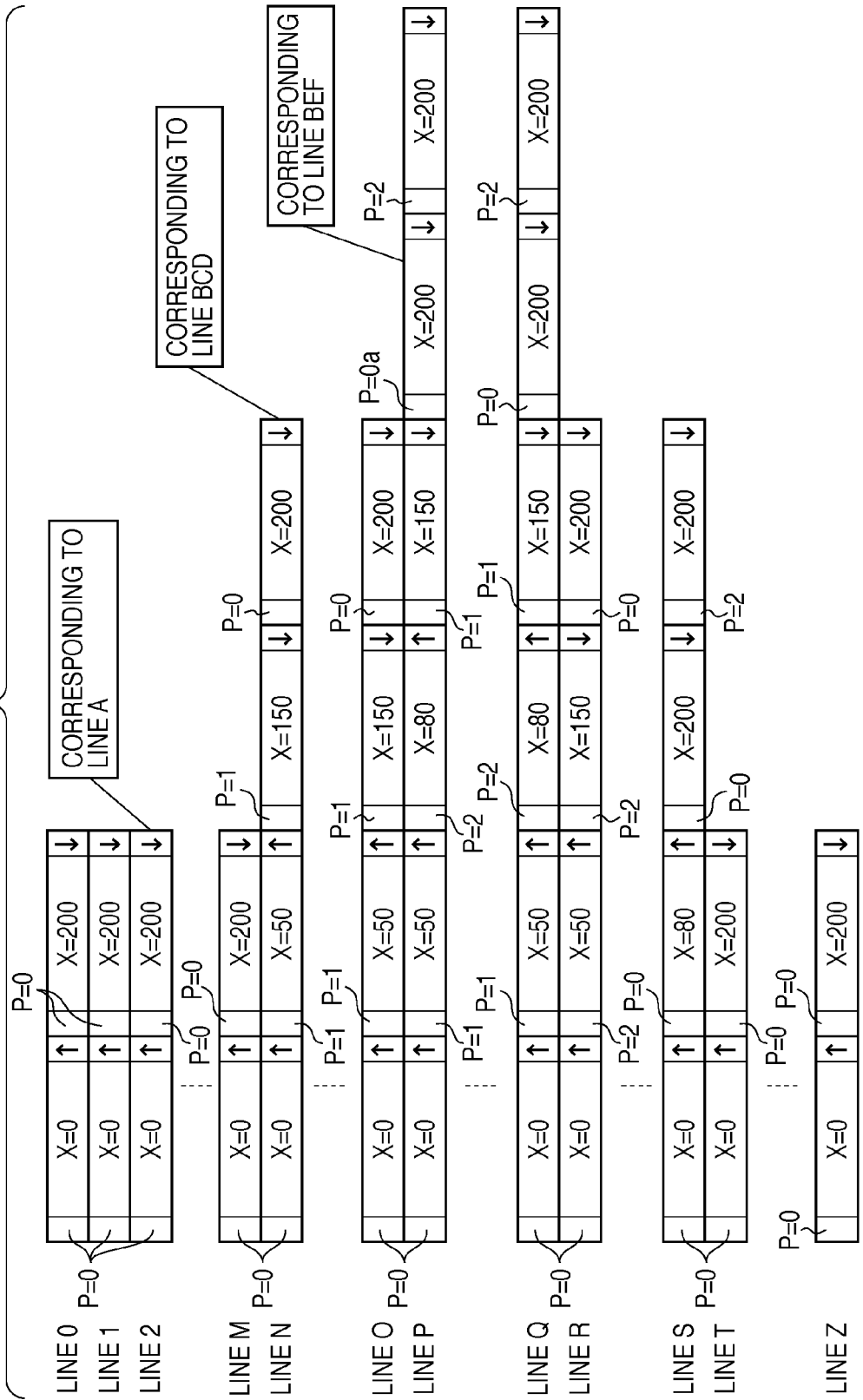

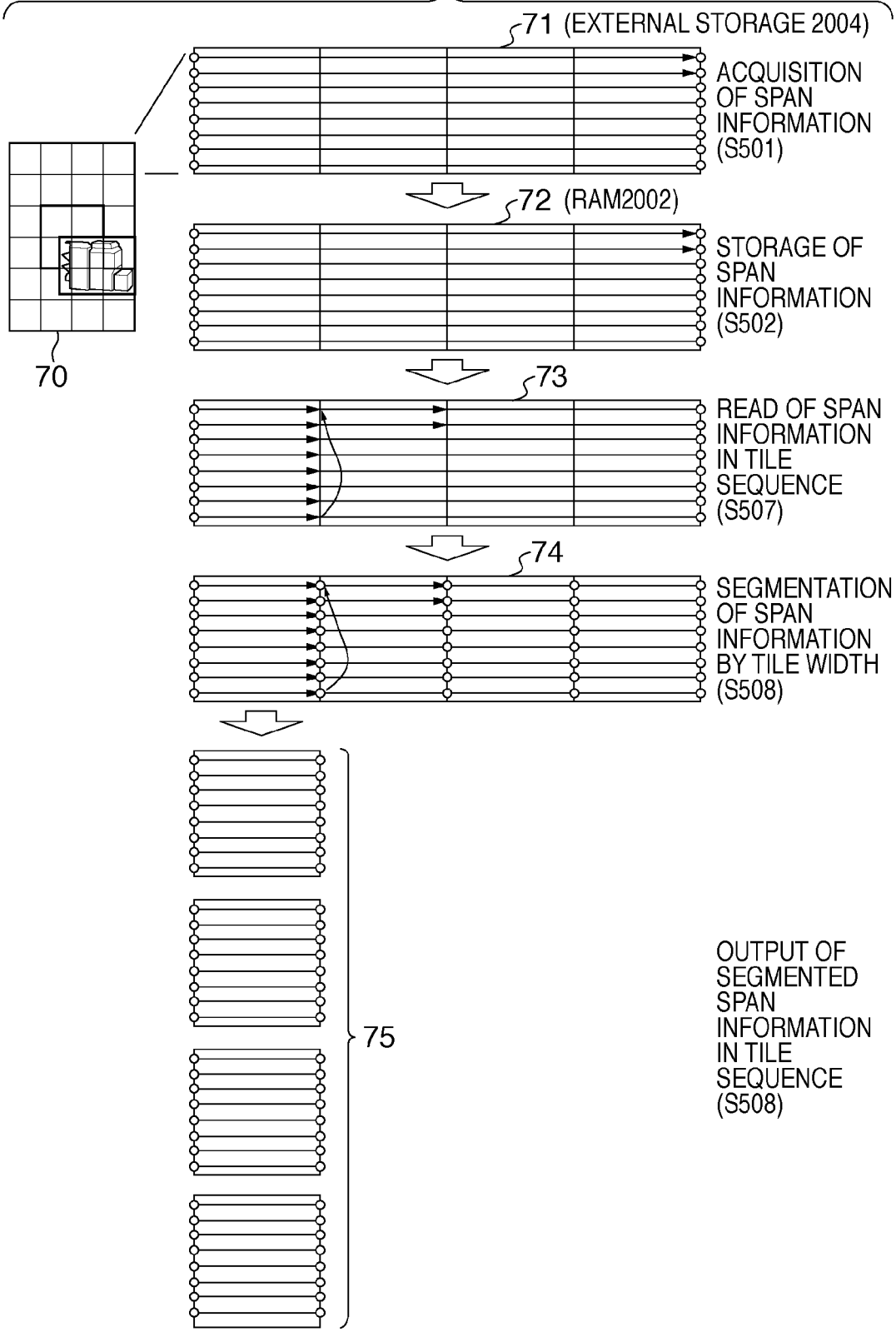

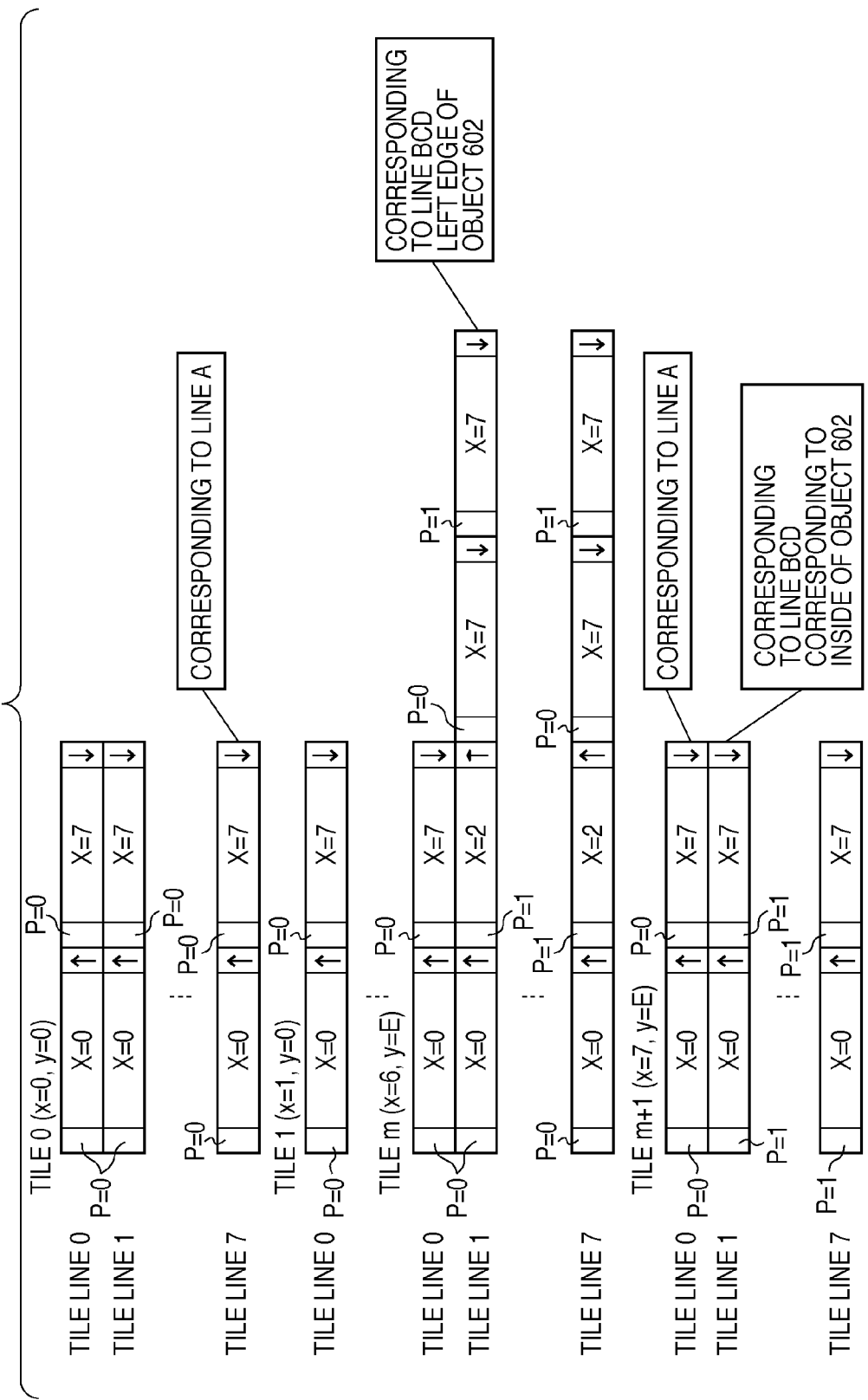

FIG. 10B

| State | FSM EXTERNAL SIGNAL | | | | | | | FSM INTERNAL REGISTER |
|---|---|---|---|---|---|---|---|---|
| | start0 | addr0 | LineAddrValid02 | LineAddr02 | TileLineEnd02 | read01 | BandFinish | i_addr |
| S0 | 0 | i_addr | 0 | i_addr | | | 0 | Band_addr0 |
| S1 | 0 | i_addr | 1 | i_addr | | | 0 | i_addr |
| S2 | 0 | i_addr | 0 | i_addr | | | 0 | i_addr |
| S3 | 1 | i_addr | 0 | i_addr | | | 0 | i_addr |
| S4 | 0 | i_addr | 0 | i_addr | | 1 | 0 | i_addr |
| S5 | 0 | i_addr | 0 | i_addr | | 0 | 0 | i_addr+1 |
| S6 | 1 | i_addr | 0 | i_addr | | 1 | 0 | i_addr |
| S7 | 0 | i_addr | 0 | i_addr | | 0 | 0 | i_addr |
| S8 | 0 | i_addr | 0 | i_addr | 1 | 0 | 0 | i_addr+1 |
| S9 | 0 | i_addr | 1 | i_addr | 0 | 0 | 0 | i_addr |
| S10 | 0 | i_addr | 0 | i_addr | 0 | 0 | 1 | Band_addr1 |
| S11 | 0 | i_addr | 1 | i_addr | | 0 | 0 | i_addr |
| S12 | 0 | i_addr | 0 | i_addr | | 0 | 0 | i_addr |
| S13 | 1 | i_addr | 0 | i_addr | | 0 | 0 | i_addr |
| S14 | 0 | i_addr | 0 | i_addr | | 1 | 0 | i_addr |
| S15 | 0 | i_addr | 0 | i_addr | | 0 | 0 | i_addr+1 |
| S16 | 1 | i_addr | 0 | i_addr | | 1 | 0 | i_addr |
| S17 | 0 | i_addr | 0 | i_addr | | 0 | 0 | i_addr |
| S18 | 0 | i_addr | 0 | i_addr | 1 | 0 | 0 | i_addr+1 |
| S19 | 0 | i_addr | 1 | i_addr | 0 | 0 | 0 | i_addr |
| S20 | 0 | i_addr | 0 | i_addr | 0 | 0 | 0 | i_addr |
| S21 | 0 | i_addr | 0 | i_addr | 0 | 0 | 1 | i_addr |

FIG. 11B

| State | read03 | flush | start2 | addr2 | span01 | span_valid01 | band_finish |
|---|---|---|---|---|---|---|---|
| | | | | FSM EXTERNAL SIGNAL | | | |
| S0 | 0 | 0 | 0 | i_cur_addr | 0 | 0 | 0 |
| S1 | 0 | 0 | 0 | i_cur_addr | 0 | 0 | 0 |
| S2 | 1 | 0 | 0 | i_cur_addr | 0 | 0 | 0 |
| S3 | 0 | 1 | 0 | i_cur_addr | 0 | 0 | 0 |
| S4 | 0 | 0 | 0 | i_cur_addr | 0 | 0 | 0 |
| S5 | 0 | 0 | 1 | i_cur_addr | 0 | 0 | 0 |
| S6 | 0 | 0 | 0 | i_cur_addr | 0 | 0 | 0 |
| S7 | 0 | 0 | 0 | i_cur_addr | 0 | 0 | 0 |
| S8 | 0 | 0 | 0 | i_cur_addr | 0 | 1 | 0 |
| S9 | 0 | 0 | 1 | i_cur_addr | 0 | 0 | 0 |
| S10 | 0 | 0 | 0 | i_cur_addr | 0 | 0 | 0 |
| S11 | 0 | 0 | 0 | i_cur_addr | X-i_cur_x | 0 | 0 |
| S12 | 0 | 0 | 0 | i_cur_addr | 0 | 1 | 0 |
| S13 | 0 | 0 | 0 | i_cur_addr | 8 | 1 | 0 |
| S14 | 0 | 0 | 0 | i_cur_addr | 0 | 0 | 0 |
| S15 | 0 | 0 | 0 | i_cur_addr | 0 | 0 | 0 |
| S16 | 0 | 0 | 0 | i_cur_addr | 0 | 0 | 0 |
| S17 | 0 | 0 | 0 | i_cur_addr | 0 | 0 | 1 |

F I G. 11C

| State | i_cur_addr | i_addr_line0 | i_addr_line1 | i_addr_line2 | i_addr_line3 | i_addr_line4 | i_addr_line5 | i_addr_line6 |
|---|---|---|---|---|---|---|---|---|
| S0 | 0 | 0 | 0 | 0 | 0 | 0 | 0 | 0 |
| S1 | i_cur_addr | i_addr_line0 | i_addr_line1 | i_addr_line2 | i_addr_line3 | i_addr_line4 | i_addr_line5 | i_addr_line6 |
| S2 | i_cur_addr | LineAddr03 if (i_lines_in_tile == 0) | LineAddr03 if (i_lines_in_tile == 1) | LineAddr03 if (i_lines_in_tile == 2) | LineAddr03 if (i_lines_in_tile == 3) | LineAddr03 if (i_lines_in_tile == 4) | LineAddr03 if (i_lines_in_tile == 5) | LineAddr03 if (i_lines_in_tile == 6) |
| S3 | i_cur_addr | i_addr_line0 | i_addr_line1 | i_addr_line2 | i_addr_line3 | i_addr_line4 | i_addr_line5 | i_addr_line6 |
| S4 | i_addr_lineX (X == i_lines_in_tile) | | | | | | | |
| S5 | i_cur_addr | i_addr_line0 | i_addr_line1 | i_addr_line2 | i_addr_line3 | i_addr_line4 | i_addr_line5 | i_addr_line6 |
| S6 | i_cur_addr | i_addr_line0 | i_addr_line1 | i_addr_line2 | i_addr_line3 | i_addr_line4 | i_addr_line5 | i_addr_line6 |
| S7 | i_cur_addr+ | i_addr_line0 | i_addr_line1 | i_addr_line2 | i_addr_line3 | i_addr_line4 | i_addr_line5 | i_addr_line6 |
| S8 | i_cur_addr+ | i_addr_line0 | i_addr_line1 | i_addr_line2 | i_addr_line3 | i_addr_line4 | i_addr_line5 | i_addr_line6 |
| S9 | i_cur_addr | i_addr_line0 | i_addr_line1 | i_addr_line2 | i_addr_line3 | i_addr_line4 | i_addr_line5 | i_addr_line6 |
| S10 | i_cur_addr | i_addr_line0 | i_addr_line1 | i_addr_line2 | i_addr_line3 | i_addr_line4 | i_addr_line5 | i_addr_line6 |
| S11 | i_cur_addr+ | i_addr_line0 | i_addr_line1 | i_addr_line2 | i_addr_line3 | i_addr_line4 | i_addr_line5 | i_addr_line6 |
| S12 | i_cur_addr | i_addr_line0 | i_addr_line1 | i_addr_line2 | i_addr_line3 | i_addr_line4 | i_addr_line5 | i_addr_line6 |
| S13 | i_cur_addr | i_addr_line0 | i_addr_line1 | i_addr_line2 | i_addr_line3 | i_addr_line4 | i_addr_line5 | i_addr_line6 |
| S14 | i_cur_addr | i_cur_addr if (i_lines_in_tile) | i_cur_addr if (i_lines_in_tile) | i_cur_addr if (i_lines_in_tile) | i_cur_addr if (i_lines_in_tile) | i_cur_addr if (i_lines_in_tile) | i_cur_addr if (i_lines_in_tile) | i_cur_addr if (i_lines_in_tile) |
| S15 | i_cur_addr | i_addr_line0 | i_addr_line1 | i_addr_line2 | i_addr_line3 | i_addr_line4 | i_addr_line5 | i_addr_line6 |
| S16 | i_cur_addr | i_addr_line0 | i_addr_line1 | i_addr_line2 | i_addr_line3 | i_addr_line4 | i_addr_line5 | i_addr_line6 |
| S17 | 0 | 0 | 0 | 0 | 0 | 0 | 0 | 0 |

FIG. 11D

| State | i_addr_line7 | i_x_tile_left | i_x_tile_right | i_tile_num | i_cur_x | | i_lines_in_tile |
|---|---|---|---|---|---|---|---|
| S0 | 0 | 0 | 8 | 0 | 0 | X | 0 |
| S1 | i_addr_line7 | i_x_tile_left | i_x_tile_right | i_tile_num | i_cur_x | X | i_lines_in_tile |
| S2 | LineAddr03 if (i_lines_in_tile == 7) | i_x_tile_left | i_x_tile_right | i_tile_num | | | i_lines_in_tile+1 |
| S3 | i_addr_line7 | i_x_tile_left | i_x_tile_right | i_tile_num | i_cur_x | X | 0 |
| S4 | i_addr_line7 | i_x_tile_left | i_x_tile_right | i_tile_num | i_cur_x | X | i_lines_in_tile |
| S5 | i_addr_line7 | i_x_tile_left | i_x_tile_right | i_tile_num | i_cur_x | X | i_lines_in_tile |
| S6 | i_addr_line7 | i_x_tile_left | i_x_tile_right | i_tile_num | i_cur_x | data_rd_2 | i_lines_in_tile |
| S7 | i_addr_line7 | i_x_tile_left | i_x_tile_right | i_tile_num | i_cur_x | X | i_lines_in_tile |
| S8 | i_addr_line7 | i_x_tile_left | i_x_tile_right | i_tile_num | i_x_tile_left | X | i_lines_in_tile |
| S9 | i_addr_line7 | i_x_tile_left | i_x_tile_right | i_tile_num | i_cur_x | X | i_lines_in_tile |
| S10 | i_addr_line7 | i_x_tile_left | i_x_tile_right | i_tile_num | i_cur_x | data_rd_2 | i_lines_in_tile |
| S11 | i_addr_line7 | i_x_tile_left | i_x_tile_right | i_tile_num | X | X | i_lines_in_tile |
| S12 | i_addr_line7 | i_x_tile_left | i_x_tile_right | i_tile_num | i_cur_x | X | i_lines_in_tile |
| S13 | i_addr_line7 | i_x_tile_left | i_x_tile_right | i_tile_num | i_x_tile_left | X | i_lines_in_tile |
| S14 | i_cur_addr if (i_lines_in_tile) | i_x_tile_left | i_x_tile_right | i_tile_num | i_cur_x | X | i_lines_in_tile |
| S15 | i_addr_line7 | i_x_tile_left | i_x_tile_right | i_tile_num | i_cur_x | X | i_lines_in_tile |
| S16 | i_addr_line7 | i_x_tile_left+8 | i_x_tile_right+8 | i_tile_num+1 | i_cur_x | X | i_lines_in_tile+1 |
| S17 | 0 | 0 | | 0 | 0 | X | 0 |

FSM INTERNAL REGISTER

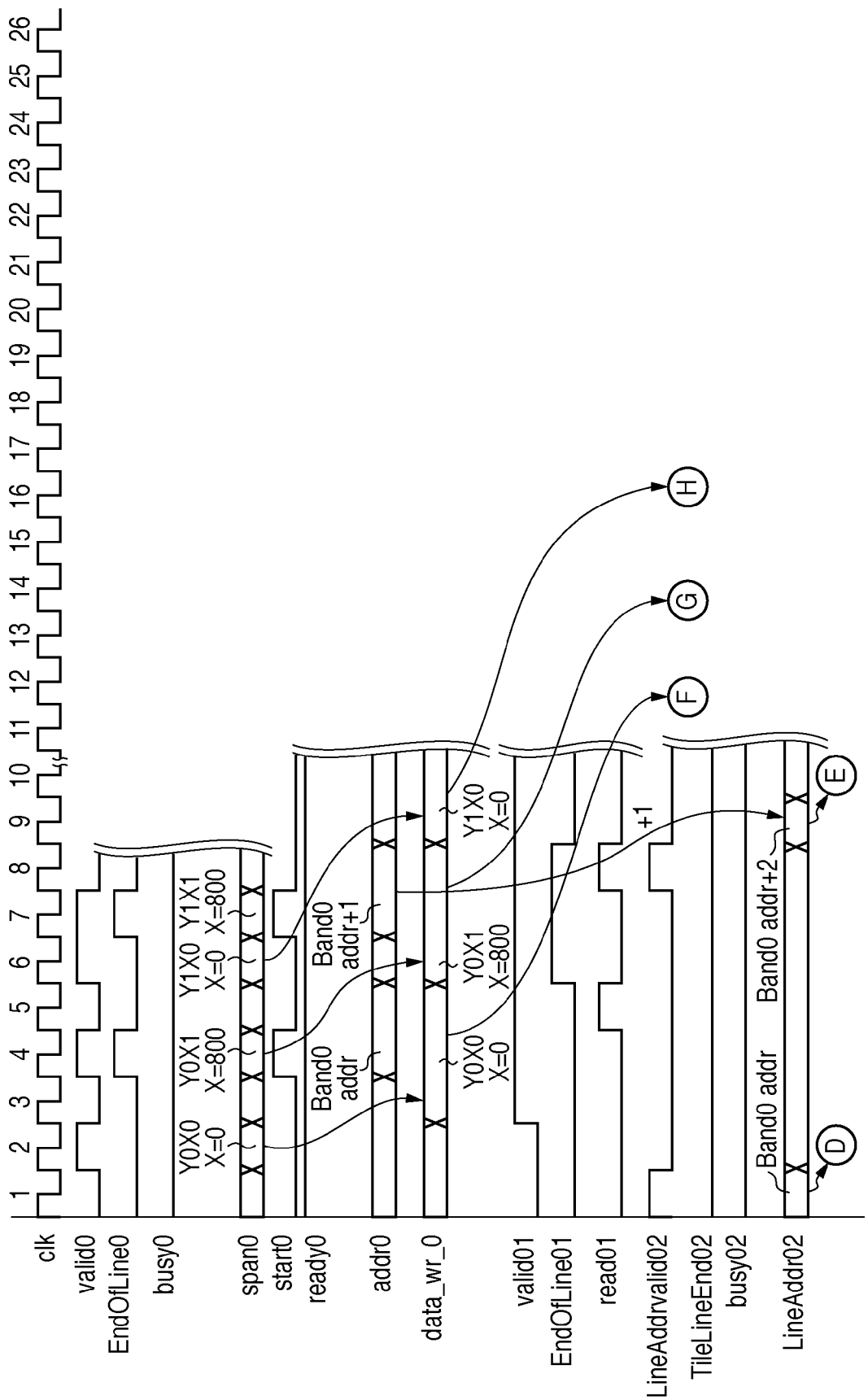

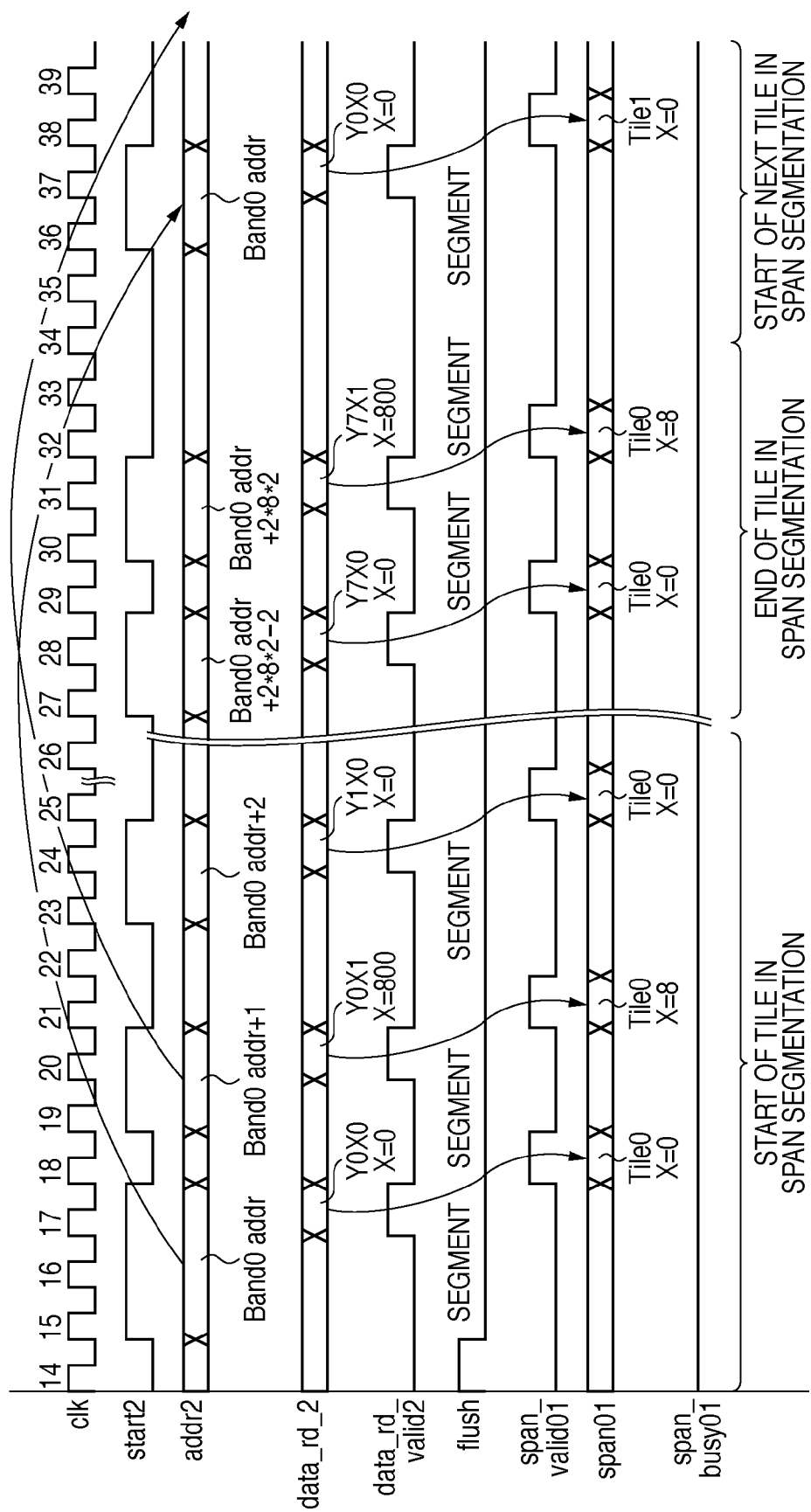

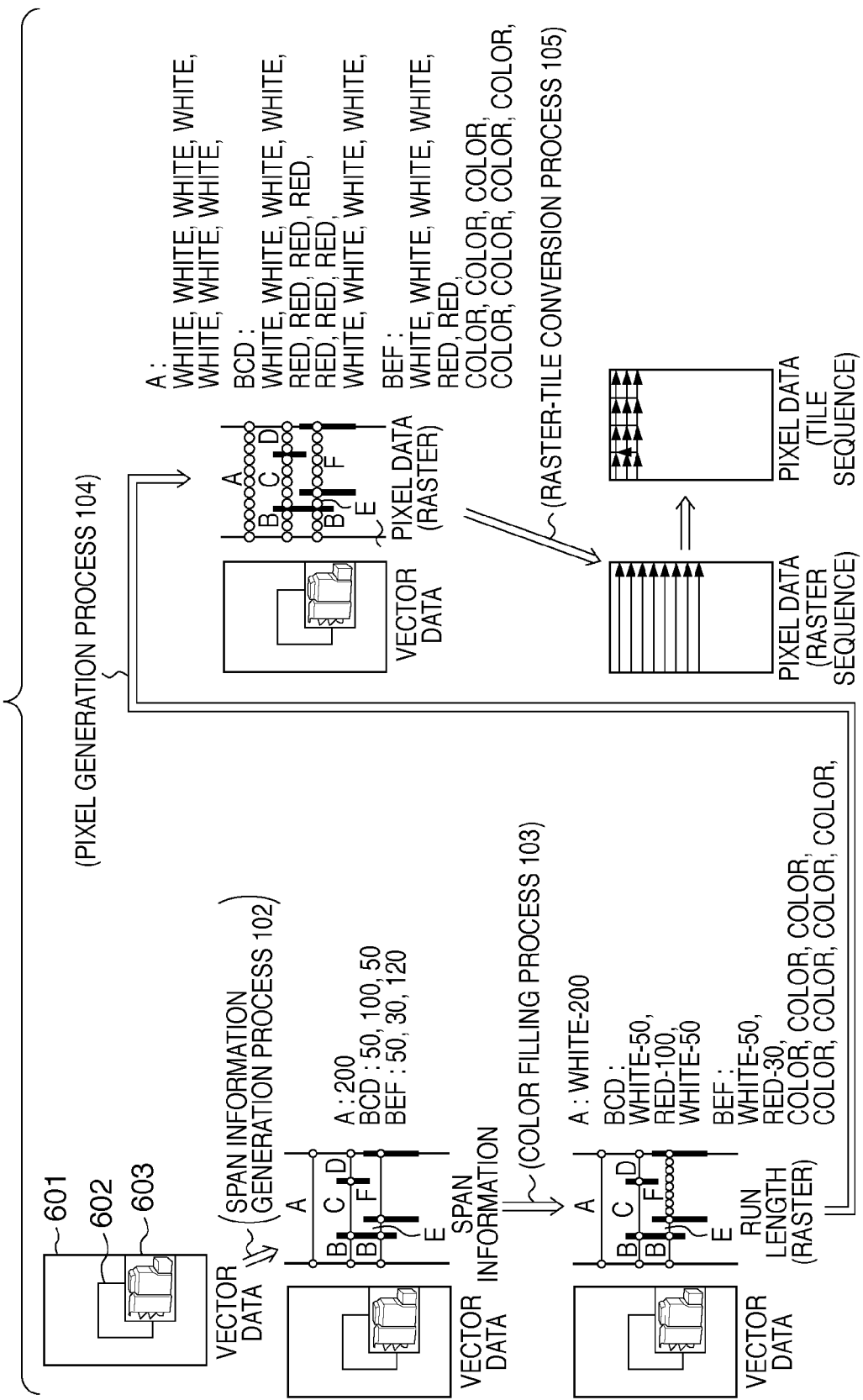

IMAGE PROCESSING APPARATUS AND CONTROL METHOD THEREOF

BACKGROUND OF THE INVENTION

1. Field of the Invention

The present invention relates to an image processing apparatus and control method thereof. For example, the present invention relates to an image processing technique associated with a printer or multi-function peripheral which prints vector data such as a page description language. Particularly, the present invention relates to an image processing technique associated with a printer or multi-function peripheral which converts an image in raster sequence into an image in tile sequence when spooling a raster image after rendering.

2. Description of the Related Art

A multi-function peripheral has been proposed as an image processing apparatus which renders vector data such as a page description language, spools a generated raster image or a raster image read from a scanner, and causes a printer engine to print. As disclosed in Japanese Patent Laid-Open Nos. 2002-300190 and 2002-305622, when spooling a raster image, the image is converted from the raster sequence into the tile sequence (this process will be called a raster-tile conversion process hereinafter). In this case, image processes can be executed in parallel, achieving high-speed printing.

FIGS. 16A and 16B are a block diagram showing the controller arrangement of a conventional image processing apparatus which performs the raster-tile conversion process (only building elements associated with this specification will be explained with reference to FIGS. 16A and 16B). FIGS. 16A and 16B show a controller unit 2000 of the image processing apparatus. The controller unit 2000 includes a system controller unit 2150 which is formed from a 1-chip ASIC surrounded by a broken line, generates output image data from externally received page description language data, and processes input image data. The controller unit 2000 also includes an image processing unit 2149 which is formed from a 1-chip ASIC surrounded by a broken line, receives and outputs output image data from the system controller unit 2150, and transmits input image data to the system controller unit 2150.

A CPU 2001 processes page description language data received via a network 2011, and converts it into a renderable display list. A rendering unit 2060 generates a raster image. The pixels of the generated raster image are sent as video signals 211 in the raster sequence to a tile generation unit 2061 via an image conversion unit 2135. The tile generation unit 2061 converts the pixels into the tile sequence.

The building elements in FIGS. 16A and 16B will be referred to in the description of FIGS. 17 and 18.

FIG. 17 is a data flowchart showing details of the rendering unit 2060 in the prior art. A display list store on the left side of FIG. 17 corresponds to a renderable display list converted from page description language data upon a process by the CPU 2001. The display list store is stored in, e.g., an external storage 2004 in FIG. 16A. A temporary store on the right side of FIG. 17 is an area for temporarily storing data during a process by the rendering unit 2060. The temporary store is reserved in, e.g., a RAM 2002 in FIG. 16A. The center in FIG. 17 corresponds to process function units executed by the rendering unit 2060, and is implemented by hardware, software, or a combination of them.

A command execution unit 300 fetches a command stream of the display list, and sequentially executes the commands. By using a border record store, a border processing unit 400 converts border information into information on X coordinates and a graphic object for each scan line. The pair of X coordinates of each graphic object serves as span information of the graphic object on the scan line. By using a priority order characteristic/status table, a priority order determination unit 500 determines a visible object from the priority order of the positional relationship between graphic objects, and generates a filling command including the span of the target scan line. By using a filling data table, a filled color determination unit 600 determines a color to fill pixel data of a raster image for each object of the target scan line. For a flat object, the filled color determination unit 600 generates the color and span of the flat object. For an object which is not flat, such as an image or gradation, the filled color determination unit 600 generates the color of each pixel. By using a pixel composition stack, a pixel composition unit 700 composites the colors of overlapping objects using generated colors. When compositing flat objects, the pixel composition unit 700 outputs the composited color and run-length information. When compositing objects which are not flat, the pixel composition unit 700 outputs pieces of color information. A pixel output unit 800 expands the run-length information generated by the pixel composition unit 700 into information of all pixels, and transmits the expanded information as the video signal 211.

FIG. 18 is a data process flowchart showing a process sequence from reception of a page description language to printing in the arrangement of the prior art in FIGS. 16A, 16B, and 17. In the following description, building elements with reference numerals in FIGS. 16A and 16B, and processing units in FIG. 17 will be referred to.

The CPU 2001 performs a vector data generation process 101 to generate display list-type vector data from a page description language. The command execution unit 300, border processing unit 400, and priority order determination unit 500 perform a span generation process 102 to convert the display list data into span information of each scan line. The filled color determination unit 600 and pixel composition unit 700 perform a color filling process 103. The pixel output unit 800 performs a pixel generation process 104. The span generation process 102, color filling process 103, and pixel generation process 104 are executed by the rendering unit 2060 in FIG. 16A.

The tile generation unit 2061 in FIG. 16A executes a raster-tile conversion process 105 for generated pixels. The raster-tile conversion process 105 requires an intermediate buffer memory 106 to store a raster image corresponding to the height of a tile. As the intermediate buffer memory 106, the tile generation unit 2061 in FIG. 16A uses a partial area of a main memory (RAM) 2002 accessed via a system bus bridge 2007 and RAM controller 2124. The tile generation unit 2061 also executes a tile image compression process 107. The compressed rater images in the tile sequence are spooled in the external storage 2004 of FIG. 16A by a spool process 108.

A tile expansion unit 2103 in FIG. 16B performs an expansion process 109 for the image having undergone the spool process 108 in the external storage 2004 of FIG. 16A. An image rotation unit 2030 and the like perform a rotation process 110 and the like for the expanded image via a tile bus 2107. Image output interfaces 2113, 2151, 2152, and 2153 perform tile-raster conversion for the expanded tile-type pixel data having undergone the rotation process and the like. Image processing units 2115, 2154, 2155, and 2156 for a printer execute a color conversion process 113 and halftone process 114. A printer 2095 performs a print process 115.

A tile-raster conversion process 111 requires an intermediate memory 112 corresponding to the height of a tile. The image output interfaces 2113, 2151, 2152, and 2153 use a partial area in an image memory 2123 via a memory bus 2108.

FIG. 19 is a schematic view showing an example of processed data obtained by the vector data generation process 101 to the raster-tile conversion process 105 in the process sequence of the prior art shown in FIG. 18. A process to rasterize a flat object 602 and image 603 in a background 601 will be exemplified. A region where neither the red and rectangle object 602 nor image 603 exists is a background, and the background is white in this example.

Vector data represented by the first stage of FIG. 19 is generated by the vector data generation process 101.

The generated vector data is converted into span information represented by the second stage of FIG. 19 by the span information generation process 102. Since scan line A contains only the background, scan line A has span A ranging from the right to left edges of a page. Scan line BCD contains the red and rectangle object 602. For scan line BCD, span B of the background, span C of the red and rectangle object, and span D of the background are generated. Scan line BEF contains the red and rectangle object 602 and image 603. For scan line BEF, span B of the background, span E of the red and rectangle object 602, and span F of the image 603 are generated.

Subsequently, the color filling process 103 is executed as represented by the third stage of FIG. 19. For scan line A, run-length information is generated as a combination of the background color "white" and the span length. For scan line BCD, run-length information is generated as a combination of the color "white" and span length of the background, the color and span length of the red and rectangle object 602, and the color "white" and span length of the background. For scan line BEF, run-length information is generated as a combination of the color "white" and span length of the background, the color and span length of the red and rectangle object 602, the color information arrangement of respective pixels of the image 603.

Then, the pieces of run-length information are converted into pixel information by the pixel generation process 104, as represented by the fourth stage of FIG. 19. The image is converted from the raster sequence of the page into the tile sequence by the raster-tile conversion process 105.

However, in the raster-tile conversion process 105 of the prior art, a large amount of data is read out from and written in the intermediate buffer memory 106 (RAM 2002). To convert an image of the A4 size (21 cm wide and 29.5 cm long) from the raster sequence into the tile sequence, when the print resolution is 600 dpi, the intermediate buffer memory 106 needs to store data having a size of $$(21\ [\text{cm}]/2.54\ [\text{cm/inch}] \times 600\ [dpi]) \times$$
$$(29.5\ [\text{cm}]/2.54\ [\text{cm/inch}] \times 600[dpi]) =$$
$$4960\ [\text{pixels}] \times 6968\ [\text{pixels}] = 34.56\ [Mpixels]$$

$$1\ [\text{pixel}] = 4\ [\text{bytes}](R = 8\ \text{bits}, G = 8\ \text{bits}, B = 8\ \text{bits}, \text{Attribute} = 8\ \text{bits})$$

$$34.56\ [Mpixels] \times 4\ [\text{bytes}] = 138.24\ [MB]$$

Implementing a print speed of 85 sheets/min requires a memory data transmission band of $$(138.24\ [\text{MB: for write}] + 138.24\ [\text{MB for read}])/(60\ [\text{sec}]/85\ [\text{ppm}]) = 391.68\ [MB/s]$$

Since the print resolution is increasing year by year, a memory data transmission band necessary for a high print resolution of 1,200 dpi becomes four times wider than that for the print resolution of 600 dpi. Thus, the print resolution of 1,200 dpi requires a memory data transmission band of $$391.68\ [MB/s] \times 4 = 1566.72\ [MB/s] = 1.567\ [GB/s]$$

The theoretical memory data transmission band of a DDR2 SDRAM (400 MHz, 64 bits) is 3.2 [GB/s]. However, an effective memory data transmission band in random access falls within a range of 1 [GB/s] to 1.5 [GB/s].

At the print resolution of 600 dpi, a DRAM can be used to execute the raster-tile conversion process 105, and can also be shared with another process because the memory band has a margin. However, if the print resolution increases to 1,200 dpi, it is the limit of one DRAM to execute only the raster-tile conversion process 105. Since the memory band has no margin, another DRAM needs to be installed to perform another process. This increases the cost.

In FIG. 16A, the RAM 2002 used as the intermediate buffer memory 106 is arranged outside the ASICs (the system controller unit 2150 and image processing unit 2149 surrounded by broken lines). As another solution to widen the memory data transmission band, the intermediate buffer memory 106 may also be implemented by an on-chip memory on the ASIC without installing another DRAM. In this case, the memory requires a capacity of $$(29.5\ [\text{cm}]/2.54\ [\text{cm/inch}] \times 1200\ [dpi]) \times 32\ [\text{lines/title}] \times$$
$$2\ [\text{bands}] \times 4\ [\text{bytes}] = 4960\ [\text{pixels}] \times 6968\ [\text{pixels}] = 3.56\ [MB]$$

A 3.56-MB on-chip memory can be implemented using a 90-nm semiconductor process. However, this also greatly increases the cost, and the same problem as the above-described one still remains unsolved.

SUMMARY OF THE INVENTION

The present invention has been made to overcome the above-described drawbacks. The present inventors paid attention to the fact that, generally in most cases, the data amount of run-length information is smaller than that of a raster image, and the data amount of span information is smaller than that of run-length information, as represented by the second to fourth stages of FIG. 19. From this, instead of performing a conversion process into the tile sequence using a raster image, conventionally, the data arrangement is converted into the tile sequence using run-length information, which is an output from an upstream color filling process, or span information, which is an output from a span generation process. This process greatly reduces the amount of data temporarily stored for conversion into the tile sequence. A high-output-resolution rater-tile conversion process can be achieved even at a cost equal to or lower than a conventional one with a memory data transmission band equal to or narrower than a conventional one.

To solve the above-described problem, an image processing apparatus according to the present invention, comprises: a reception unit adapted to receive print instructing information from a host; a first conversion unit adapted to convert the received print instructing information into intermediate information capable of a rendering process; a second conversion unit adapted to convert the intermediate information into pieces of span information of respective scan lines; a color filling unit adapted to assign a color to the pieces of span information of respective scan lines, thereby generating pieces of run-length information of respective scan lines, each of which includes color information and repeat information; a generation unit adapted to generate pieces of pixel information in the tile sequence by rendering the pieces of run-length information; a segmentation unit adapted to segment pieces of input information of respective scan lines into pieces of information of respective scan lines in tiles, thereby rearranging the pieces of input information into pieces of output information of respective tiles; a compression unit adapted to perform a compression process for the pieces of pixel information in the tile sequence for each tile, thereby generating compressed data; a storage unit adapted to store a page of compressed data of respective tiles; and a printing unit adapted to perform a print process using the compressed data which are stored in the storage unit and compressed for each tile. The segmentation unit uses the pieces of span information of respective scan lines from the second conversion unit as the pieces of input information, segments the pieces of span information of respective scan lines into pieces of span information of respective scan lines in tiles to rearrange the pieces of span information of respective scan lines in tiles into pieces of span information of respective tiles, and outputs the rearranged pieces of span information of respective tiles as the pieces of output information to the color filling unit.

An image processing apparatus according to the present invention comprises: a reception unit adapted to receive print instructing information from a host; a first conversion unit adapted to convert the received print instructing information into intermediate information capable of a rendering process; a second conversion unit adapted to convert the intermediate information into pieces of span information of respective scan lines; a color filling unit adapted to assign a color to the pieces of span information of respective scan lines, thereby generating pieces of run-length information of respective scan lines, each of which includes color information and repeat information; a generation unit adapted to generate pieces of pixel information in the tile sequence by rendering the pieces of run-length information; a segmentation unit adapted to segment pieces of input information of respective scan lines into pieces of information of respective scan lines in tiles, thereby rearranging the pieces of input information into pieces of output information of respective tiles; a compression unit adapted to perform a compression process for the pieces of pixel information in the tile sequence for each tile, thereby generating compressed data; a storage unit adapted to store a page of compressed data of respective tiles; and a printing unit adapted to perform a print process using the compressed data which are stored in the storage unit and compressed for each tile. The segmentation unit uses the pieces of color-assigned run-length information from the color filling unit as the pieces of input information, segments the pieces of color-assigned run-length information into pieces of run-length information of respective scan lines in tiles to rearrange the pieces of run-length information of respective scan lines in tiles into pieces of run-length information of respective tiles, and outputs the rearranged pieces of color-assigned run-length information of respective tiles as the pieces of output information to the generation unit.

A method of controlling an image processing apparatus, according to the present invention, comprises the steps of: receiving print instructing information from a host; first converting the received print instructing information into intermediate information capable of a rendering process; second converting the intermediate information into pieces of span information of respective scan lines; color filling by assigning a color to the pieces of span information of respective scan lines to generate pieces of run-length information of respective scan lines, each of which includes color information and repeat information; generating pieces of pixel information in the tile sequence by rendering the pieces of run-length information; segmenting pieces of input information of respective scan lines into pieces of information of respective scan lines in tiles to rearrange the pieces of input information into pieces of output information of respective tiles; performing a compression process for the pieces of pixel information in the tile sequence for each tile, thereby generating compressed data; storing a page of compressed data of respective tiles; and performing a print process using the compressed data which are stored in the storage unit and compressed for each tile. In the segmenting step, the pieces of span information of respective scan lines that are converted in the second converting step are used as the pieces of input information and segmented into pieces of span information of respective scan lines in tiles to rearrange the pieces of span information of respective scan lines in tiles into pieces of span information of respective tiles, and the rearranged pieces of span information of respective tiles are output as the pieces of output information for the color filling step.

A method of controlling an image processing apparatus according to the present invention comprises the steps of: receiving print instructing information from a host; first converting the received print instructing information into intermediate information capable of a rendering process; second converting the intermediate information into pieces of span information of respective scan lines; color filling by assigning a color to the pieces of span information of respective scan lines to generate pieces of run-length information of respective scan lines, each of which includes color information and repeat information; generating pieces of pixel information in the tile sequence by rendering the pieces of run-length information; segmenting pieces of input information of respective scan lines into pieces of information of respective scan lines in tiles to rearrange the pieces of input information into pieces of output information of respective tiles; performing a compression process for the pieces of pixel information in the tile sequence for each tile, thereby generating compressed data; storing a page of compressed data of respective tiles; and performing a print process using the compressed data which are stored in the storage unit and compressed for each tile. In the segmenting step, the pieces of color-assigned run-length information from the color filling step are used as the pieces of input information and segmented into pieces of run-length information of respective scan lines in tiles to rearrange the pieces of run-length information of respective scan lines in tiles into pieces of run-length information of respective tiles, and the rearranged pieces of color-assigned run-length information of respective tiles are output as the pieces of output information for the generating step.

An image processing apparatus according to the present invention comprises: a generation unit adapted to generate pieces of span information of respective scan lines on the basis of print instructing information from a host; a span-tile sequence conversion unit adapted to convert the generated pieces of span information of respective scan lines into pieces of span information of respective scan lines in tiles; a tile color filling unit adapted to generate pieces of run-length information of respective scan lines in tiles from the converted pieces of span information of respective scan lines in tiles; a pixel generation unit adapted to generate pieces of pixel information in a tile sequence from the generated pieces of run-length information of respective scan lines in tiles; a unit adapted to perform a compression process for the generated pieces of pixel information in the tile sequence and spool the compressed pieces of pixel information in a storage; an expansion unit adapted to expand the compressed pieces of pixel information in the tile sequence that are spooled in the storage; a tile-raster conversion unit adapted to convert the expanded pieces of pixel information in the tile sequence into pieces of pixel information of respective scan lines; and a printing unit adapted to execute printing on the basis of the pieces of pixel information of respective scan lines.

An image processing apparatus according to the present invention comprises: a generation unit adapted to generate pieces of span information of respective scan lines on the basis of print instructing information from a host; a color filling unit adapted to generate pieces of run-length information of respective scan lines from the generated pieces of span information of respective scan lines; a run length-tile sequence conversion unit adapted to generate pieces of run-length information of respective scan lines in tiles from the generated pieces of run-length information of respective scan lines; a pixel generation unit adapted to generate pieces of pixel information in a tile sequence from the generated pieces of run-length information of respective scan lines in tiles; a unit adapted to perform a compression process for the generated pieces of pixel information in the tile sequence and spool the compressed pieces of pixel information in a storage; an expansion unit adapted to expand the compressed pieces of pixel information in the tile sequence that are spooled in the storage; a tile-raster conversion unit adapted to convert the expanded pieces of pixel information in the tile sequence into pieces of pixel information of respective scan lines; and a printing unit adapted to execute printing on the basis of the pieces of pixel information of respective scan lines.

As described above, the present invention can greatly reduce a memory data transmission band necessary for the raster-tile conversion process, and can increase the print resolution while suppressing an increase in cost when implementing a printer system.

For example, when an image occupies 30% of the area of a page at a print resolution of 1,200 dpi, the data amount of run-length information is almost equal to 30% of the data amount of a raster image. Hence, a necessary memory data transmission band is reduced to 1.567 [GB/s]×30%=470 [MB/s]

This memory data transmission band can be obtained at the same cost as that for a print resolution of 600 dpi.

For example, when the data amount of span information is 32 bytes and one object exists in an entire page, the use of span information reduces a memory data transmission band necessary for a raster-tile conversion process to (32 [bytes]×(29.5 [cm]/2.54 [cm/inch]×1,200 [dpi]))× 2(read/write)/(60 [sec]/85 [ppm])=1.26 [MB/s]

Accordingly, data can be processed using a very narrow band.

Further features of the present invention will become apparent from the following description of exemplary embodiments with reference to the attached drawings.

BRIEF DESCRIPTION OF THE DRAWINGS

FIGS. 3A and 3B are a view showing an example of the data format of a display list used in the first embodiment;

FIG. 5 is a flowchart showing an example of the sequence of a span-tile sequence conversion process in the first embodiment;

FIG. 6A is a view showing an example of the format of span information in the first embodiment;

FIG. 6B is a schematic view showing an example of span information in the concrete example of FIG. 2 in the first embodiment;

FIG. 7 is a schematic view showing the span-tile sequence conversion process in the first embodiment;

FIG. 8 is a schematic view showing an example of span data in the tile sequence after the span-tile sequence conversion process for span information in FIG. 6B in the first embodiment;

FIG. 10B is a table showing an output signal in each status of the Store FSM 1302 in FIG. 10A and the status of an internal register;

FIGS. 11B-11D are a table showing an output signal in each status of the Tile Read FSM 1304 in FIG. 11A and the status of an internal register;

FIGS. 12A and 12B are a signal waveform chart showing an example of the operation of the span-tile sequence conversion process in the circuit arrangement of FIGS. 9A and 9B;

FIG. 13 is a signal waveform chart showing an example of the operation of the span-tile sequence conversion process in the circuit arrangement of FIGS. 9A and 9B;

FIG. 19 is a schematic view showing a concrete example of a data process in the prior art.

DESCRIPTION OF THE EMBODIMENTS

Preferred embodiments of the present invention will be described in detail below with reference to the accompanying drawings.

<Example of Arrangement of Image Processing Apparatus According to Embodiment>

An image processing apparatus according to an embodiment executes conversion from the raster sequence into the tile sequence using span information or run-length information. This process is executed by a rendering unit 2060 described in Description of the Related Art. An arrangement obtained by omitting the tile generation unit 2061 from FIGS. 16A and 16B is an example of the arrangement (not shown) of the controller unit of the image processing apparatus in the embodiment.

Features of the rendering unit 2060 in the embodiment will be explained in detail with reference to FIGS. 9A to 13. The process of the controller unit will be exemplified in consideration of the arrangement of the controller unit of the image processing apparatus according to the embodiment.

<Example of Operation of Image Processing Apparatus According to First Embodiment>

Figure 1:
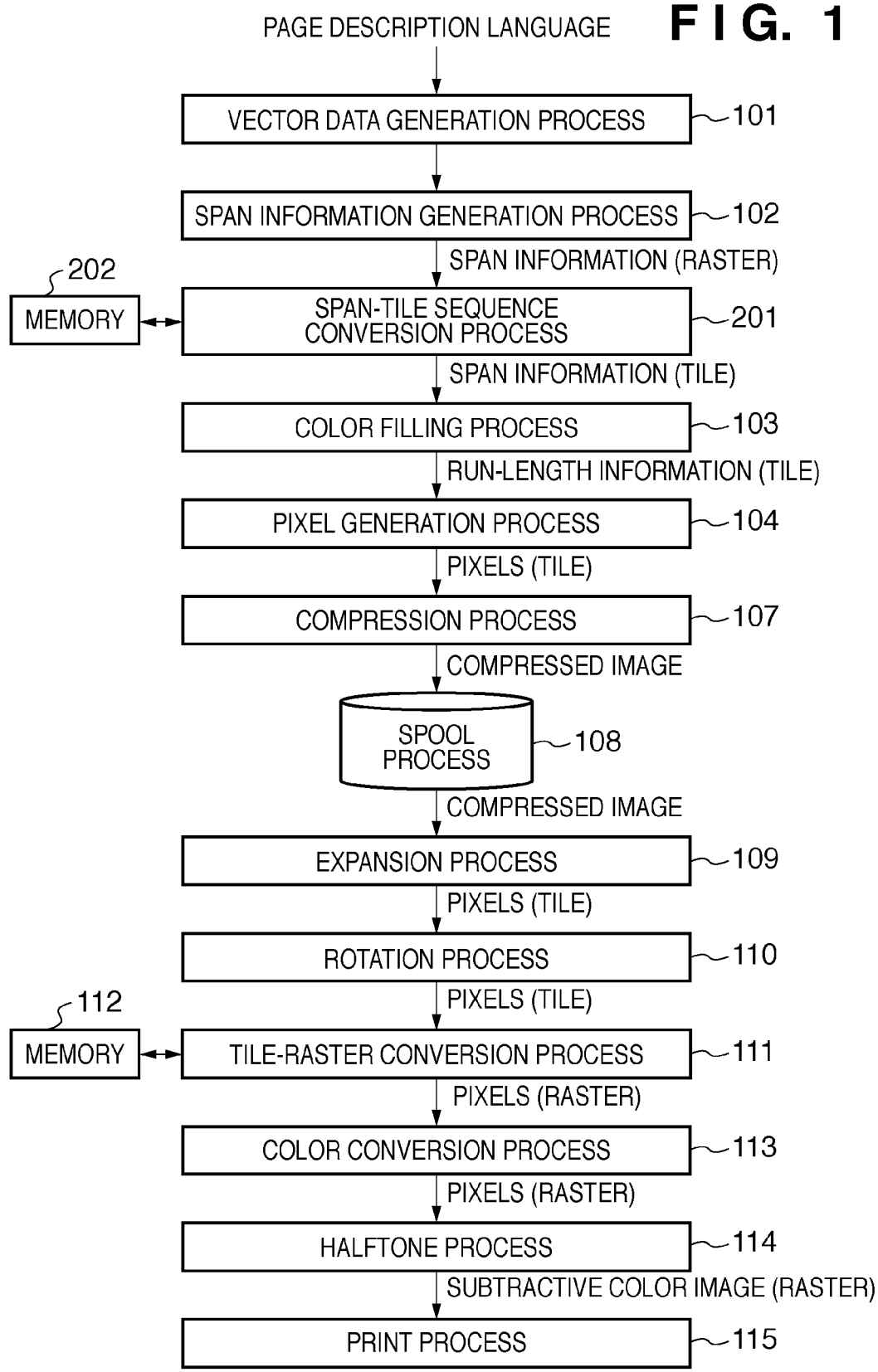
FIG. 1 is a flowchart showing an example of a process sequence in the first embodiment.
Figure 16A:
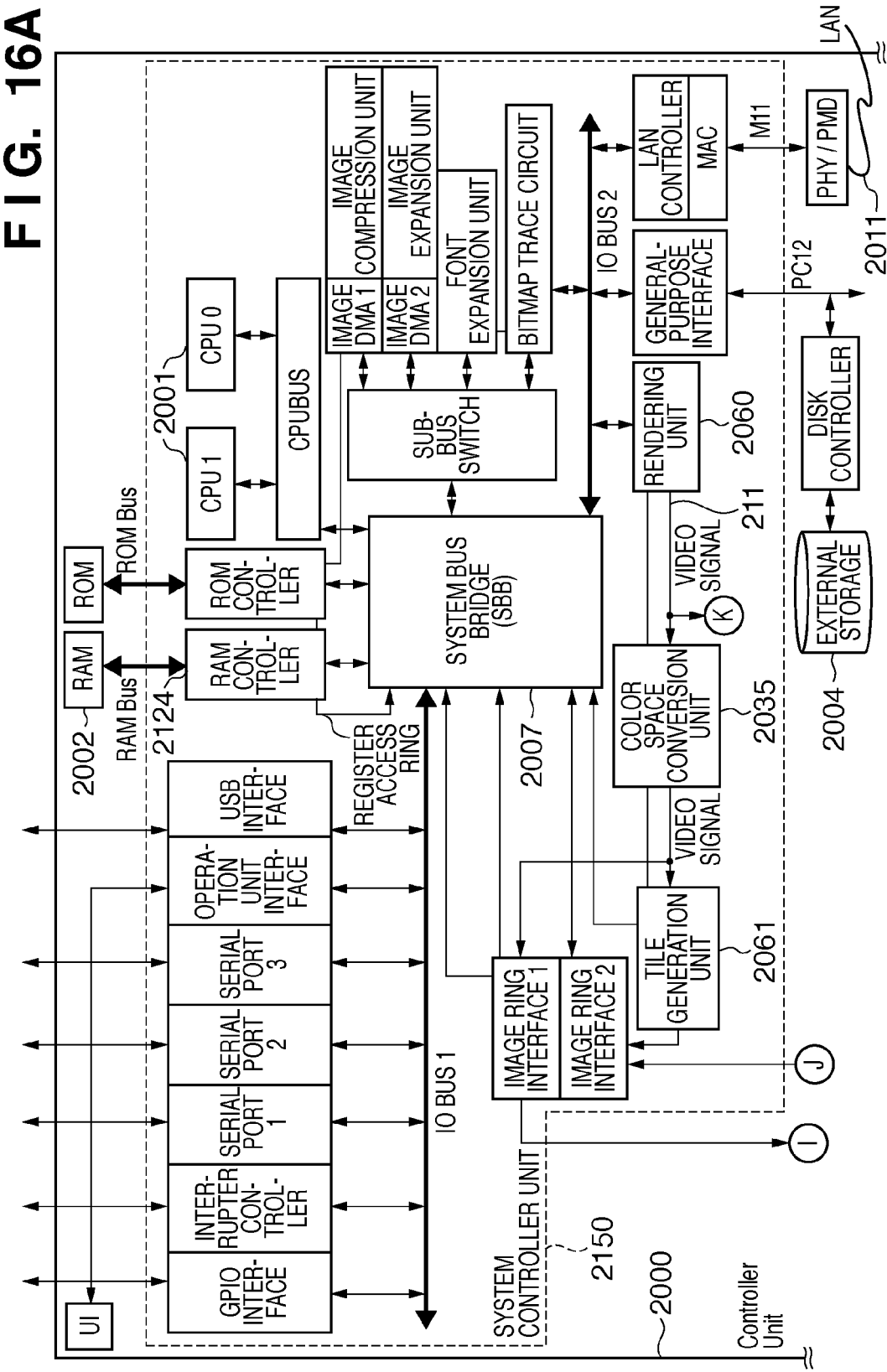
FIG. 16A is a block diagram showing an example of the arrangement of the controller unit of an image processing apparatus.
Figure 16B:
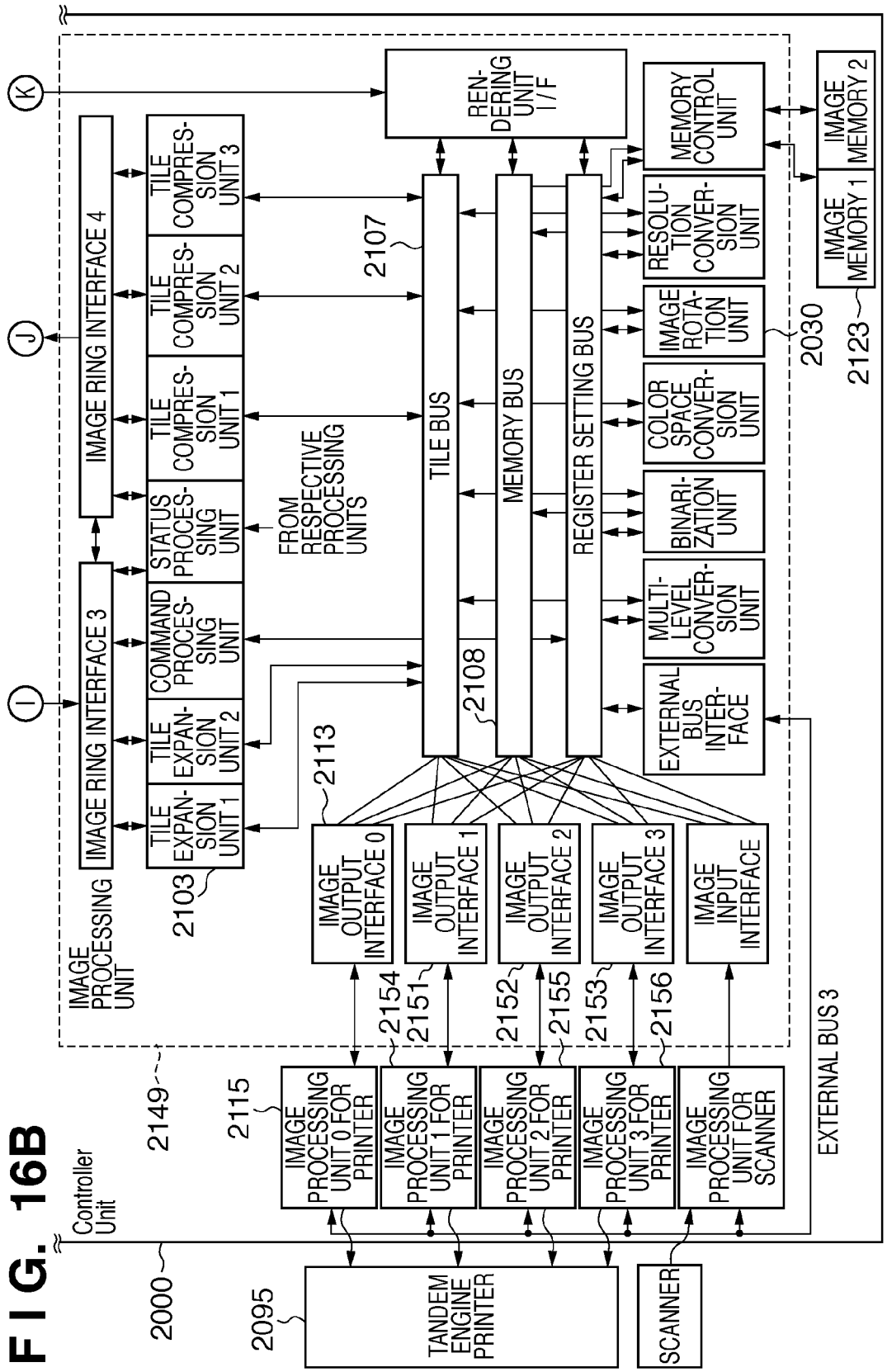
FIG. 16B is a block diagram showing an example of the arrangement of the controller unit of the image processing apparatus.
Figure 17:
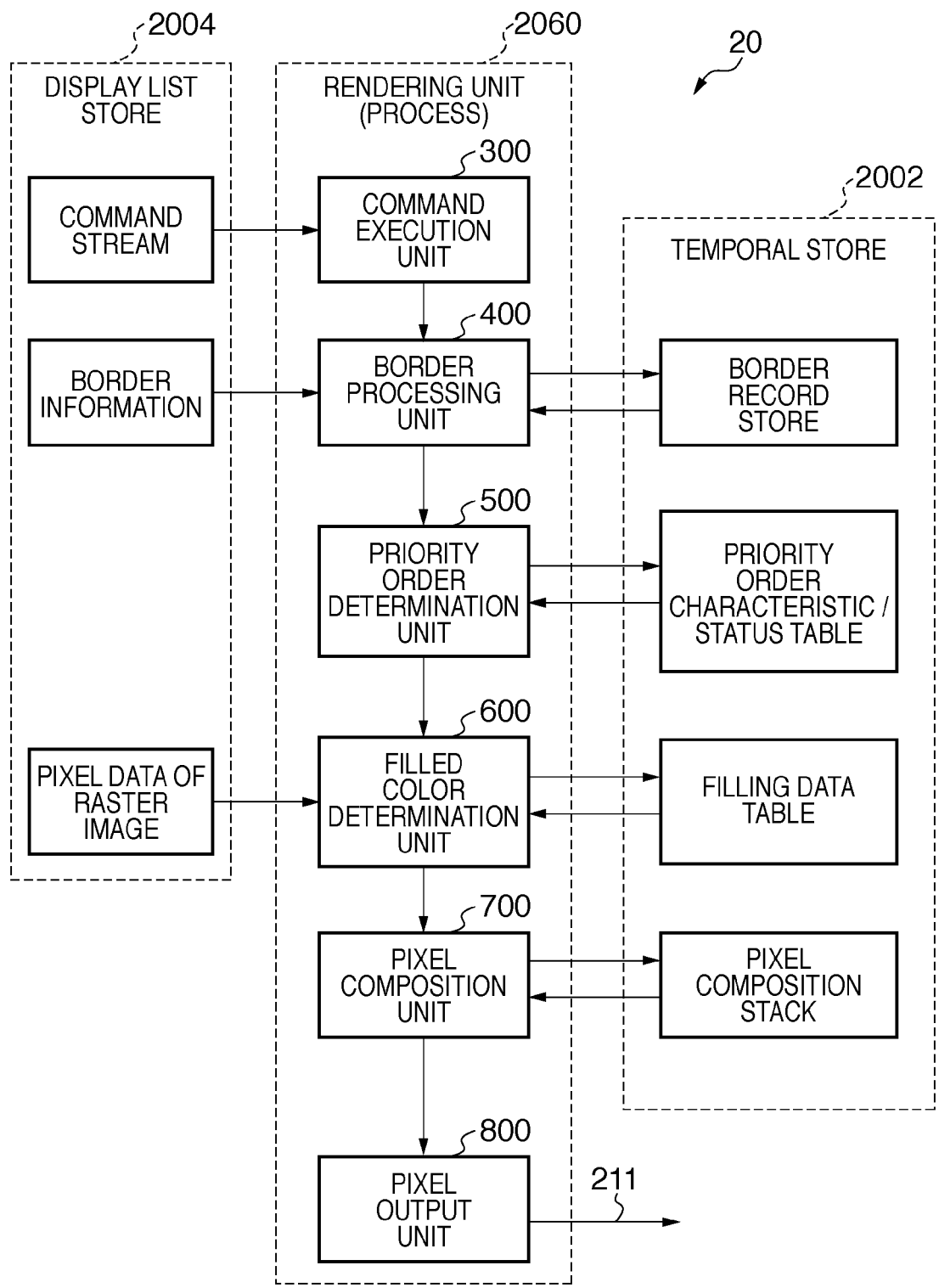
FIG. 17 is a block diagram showing an example of the arrangement of a rendering unit in the prior art.

FIG. 1 is a data process flowchart showing a process sequence from reception of a page description language to printing in the first embodiment in the above-described arrangement in which the tile generation unit 2061 is omitted from FIGS. 16A and 16B. The same reference numerals as those in the prior art of FIG. 17 denote the same processes.

A vector data generation process 101 is performed to generate display list-type vector data, which is intermediate information capable of a rendering process, from a page description language which is print instruction information. The vector data generation process 101 will be referred to as the first conversion process.

Then, a span information generation process 102 is performed to convert the display list data into pieces of span information of respective scan lines. The span information generation process 102 will be referred to as the second conversion process. In the first embodiment, the pieces of span information of respective scan lines serves as input information to a span-tile sequence conversion process 201.

In the first embodiment, the generated pieces of span information of respective scan lines are converted into pieces of span information of respective scan lines in tiles by the span-tile sequence conversion process 201. At this time, pieces of span information of scan lines corresponding to the height of a tile are stored in and read out from an intermediate buffer memory 202 (RAM 2002 in FIG. 16A). In the first embodiment, the pieces of span information of respective scan lines in tiles serve as output information from the span-tile sequence conversion process 201.

The pieces of span information of respective scan lines in tiles are assigned the color of each object by a color filling process 103, and output as pieces of run-length information of tile lines, each of which is one line of a tile in the main scanning direction. The pieces of run-length information of respective tile lines are converted into pieces of pixel information by a pixel generation process 104. The pieces of pixel information are output as pieces of pixel information in the tile sequence.

As described above, the intermediate buffer memory 202 is reserved as a partial area in the RAM 2002 serving as a main memory. A rendering unit 2060 accesses the area of the intermediate buffer memory 202 in the RAM 2002 via a system bus bridge 2007 and RAM controller 2124. The rendering unit 2060 implements processes from the span information generation process 102 including the span-tile sequence conversion process 201 to the pixel generation process 104.

Then, similar to the prior art, a compression process 107 is executed, and a page of the compressed raster images (also called compressed data) in the tile sequence is spooled in an external storage 2004 of FIG. 16A by a spool process 108. A tile expansion unit 2103 in FIG. 16B performs an expansion process 109 for the page image spooled in the external storage 2004 of FIG. 16A by the spool process 108. An image rotation unit 2030 and the like perform a rotation process 110 and the like for the expanded data via a tile bus 2107. Image output interfaces 2113, 2151, 2152, and 2153 perform tile-raster conversion for the expanded tile-type pixel data having undergone the rotation process and the like. Image processing units 2115, 2154, 2155, and 2156 for a printer execute a color conversion process 113 and halftone process 114. A printer 2095 performs a print process 115.

A tile-raster conversion process 111 requires an intermediate memory 112 corresponding to the height of a tile. The image output interfaces 2113, 2151, 2152, and 2153 use a partial area in an image memory 2123 via a memory bus 2108.

(Concrete Example of Conversion into Tile Sequence in First Embodiment)

Figure 2:
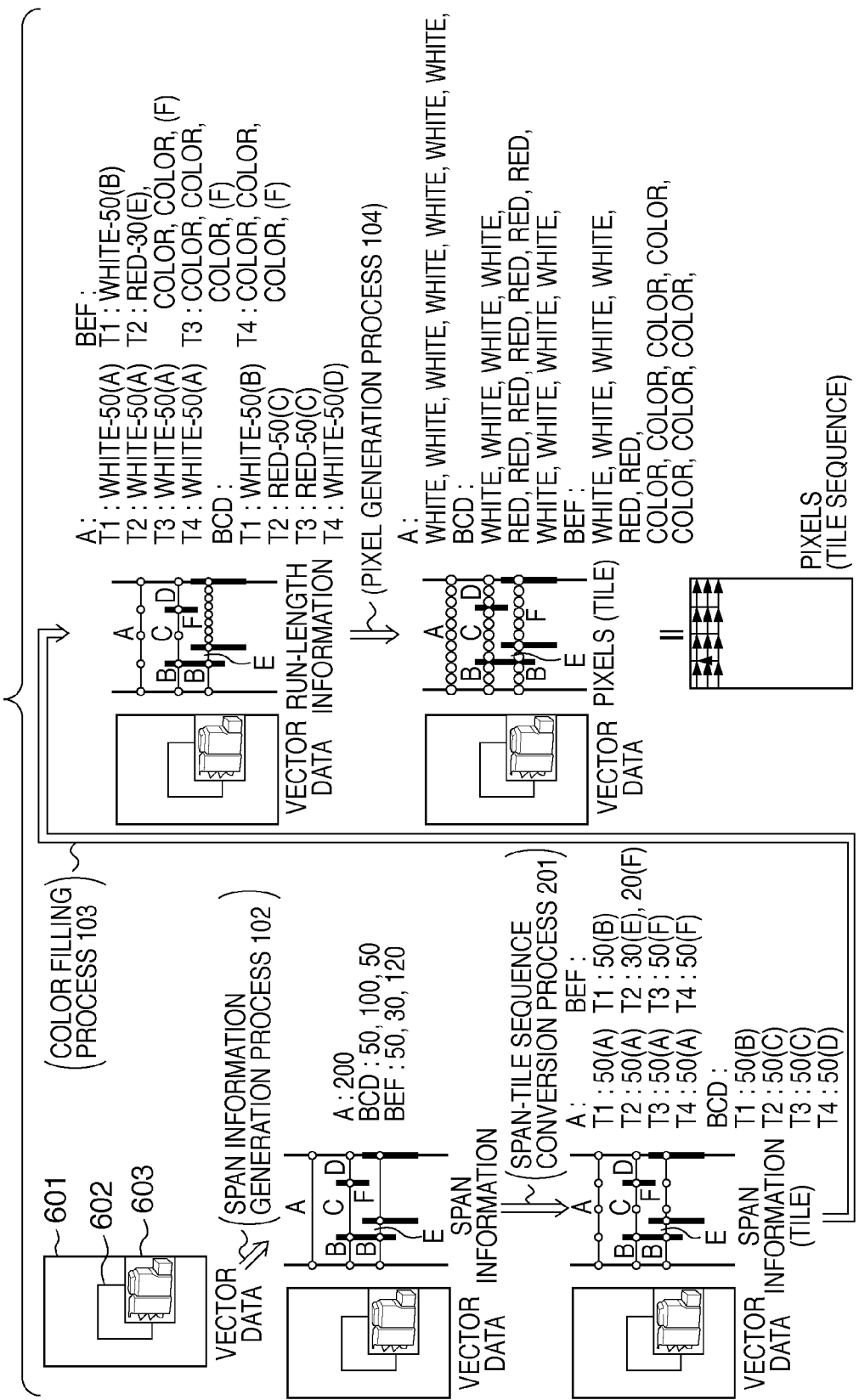
FIG. 2 is a schematic view showing a concrete example of a data process in the first embodiment.
Figure 18:
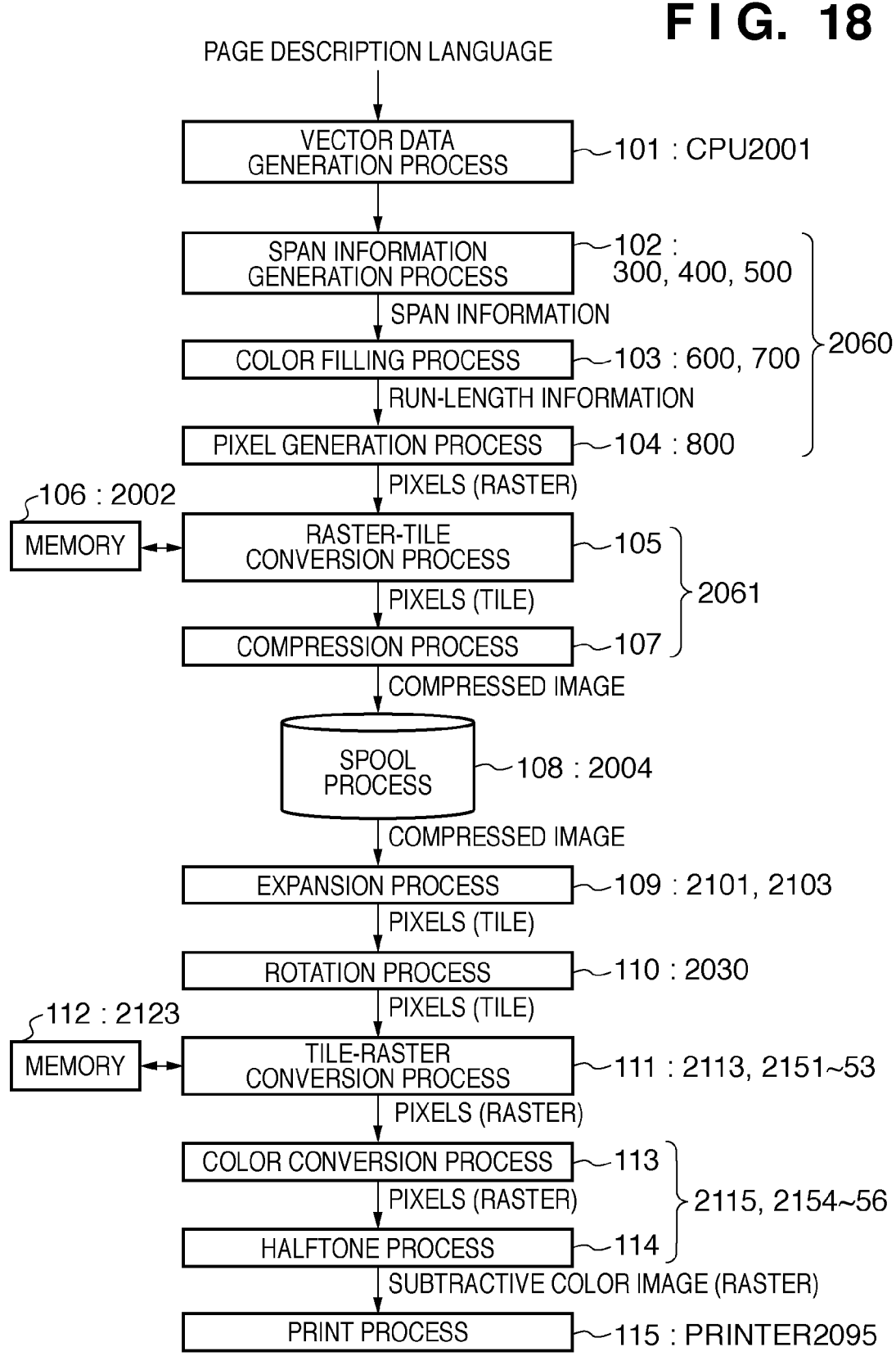
FIG. 18 is a flowchart showing an example of a process sequence to create pixel information in the tile sequence in the prior art.

FIG. 2 is a schematic view showing an example of processed data obtained by the vector data generation process 101 to the pixel generation process 104 in the process sequence of the first embodiment shown in FIG. 1. A comparison with FIG. 18 showing the prior art will clarify the operation effects of the present invention. To clarify a difference from the prior art, a background 601, red and rectangle object 602, and image 603 are identical to those in FIG. 18.

Vector data represented by the first stage of FIG. 2 is generated by the vector data generation process 101.

The generated vector data is converted into span information represented by the second stage of FIG. 2 by the span information generation process 102. Span A contains only the background, and ranges from the right to left edges of a page. Scan line BCD contains the red and rectangle object 602. For scan line BCD, span B of the background, span C of the red and rectangle object, and span D of the background are generated. Scan line BEF contains the red and rectangle object 602 and image 603. For scan line BEF, span B of the background, span E of the red and rectangle object 602, and span F of the image 603 are generated.

Then, as represented by the third stage of FIG. 2, span information of each scan line is converted into span information of a scan line in each tile by the span-tile sequence conversion process 201 according to the first embodiment.

Scan line A is segmented into four tiles T1, T2, T3, and T4. Since scan line A corresponds to the background, span A ranging from the right to left edges of the page is segmented into four spans by the tile width.

Scan line BCD is also segmented into four tiles T1, T2, T3, and T4. Scan line BCD before conversion into tiles has three spans B, C, and D in accordance with the background and the red and rectangle object. Upon segmentation, the tile T1 corresponds to span B, the tile T2 corresponds to a former segmented span of span C, the tile T3 corresponds to a latter segmented span of span C, and the tile T4 corresponds to span D.

Scan line BEF is also segmented into four tiles T1, T2, T3, and T4. Scan line BEF before conversion into tiles has three spans B, E, and F in accordance with the background, the red and rectangle object, and the image object. Upon the segmentation, the tile T1 corresponds to span B, the tile T2 corresponds to span E and a former segmented span of span F, the tile T3 corresponds to an intermediate segmented span of span F, and the tile T4 corresponds to a latter segmented span of span F.

As represented by the fourth stage of FIG. 2, the color filling process 103 is executed for each tile to generate run-length information from span information of a scan line in the tile. As represented by the fifth stage of FIG. 2, the pixel generation process 104 is executed to generate pixel information from the run-length information.

In the first embodiment, pieces of pixel information in the tile sequence are completed at the end of the pixel generation process 104, as represented by the last stage of FIG. 2.

(Example of Image Data in First Embodiment)

Figure 3B:
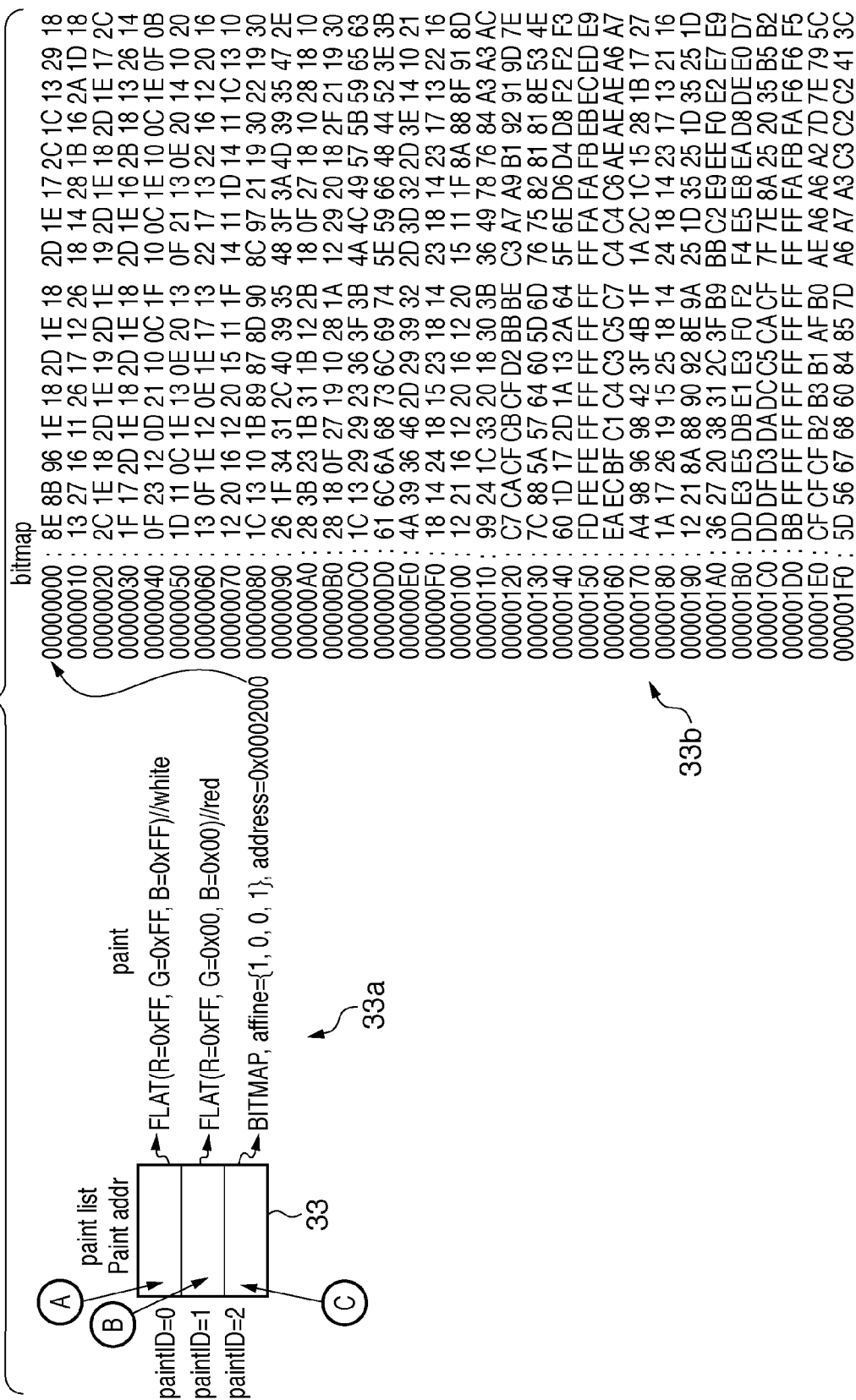

FIGS. 3A and 3B show an example of data representing the data format of a display list which is generated by the vector data generation process 101 and undergoes the span information generation process 102 in the first embodiment. In other words, FIGS. 3A and 3B are a view showing examples of a display list, priority table, paint list, and the like used in the first embodiment. The background 601, red and rectangle object 602, and image 603 are identical to those in FIGS. 2 and 18.

A display list 31 describes the image, red and rectangle object, and background. In this case, priority "0" is the highest. First, the background 601 with Priority=0 is designated, and 100 lines are rendered. Next, the red and rectangle object 602 with Priority=1 is designated, and 50 lines are rendered. Then, the image, i.e., bitmap object 603 with Priority=2 is designated, and 150 lines are rendered to the bottom of the page.

A priority table (PriorityTable) 32 representing the positional relationship between objects is prepared in addition to a rendering description. Objects are stacked sequentially from the top of the display list. Each entry in the priority table (PriorityTable) 32 includes a PaintID for color filling, and a pointer to the outline of each object. Each outline is designated by the X coordinate of a start point, and outline passes indicated by increments and decrements of the X and Y addresses. Reference numeral 32a denotes each outline.

The PaintID corresponds to the entry of a paint list (PaintTable) 33, and the PaintTable holds a pointer array to paint information 33a serving as color filling information. Each paint information 33a includes a flat (FLAT) and bitmap (BITMAP). The FLAT includes the values of R, G, and B colors. The BITMAP includes a transformation matrix for affine transformation, and a pointer to a bitmap entity 33b. In this example, the "white" background, red and rectangle object, and image bitmap are defined.

In the first embodiment, when the outline 32a of each object is determined from the priority table 32, the span information generation process and span-tile sequence conversion process are executed. The paint process based on the paint list 33 is executed upon completion of the span-tile sequence conversion process.

Figure 4:
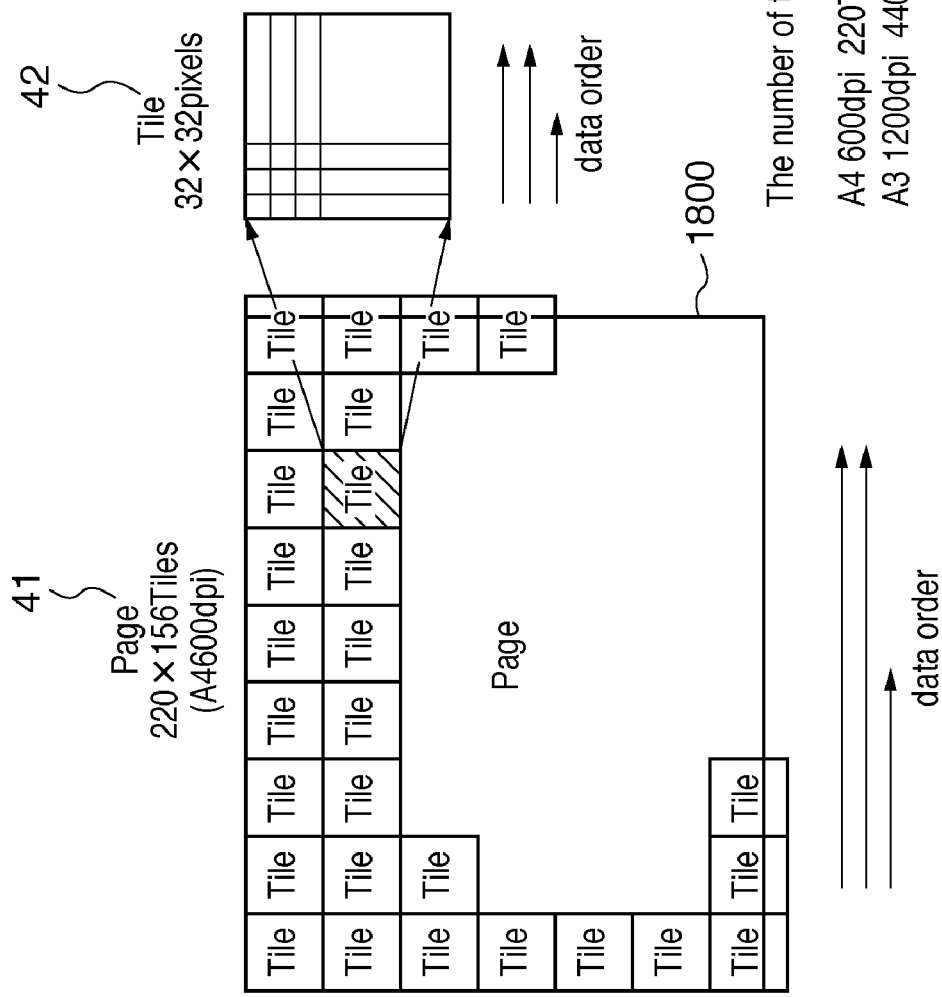
FIG. 4 is a schematic view showing the structure of a tile image created in the first embodiment.

FIG. 4 is a schematic view showing an example of tile-type image data used in the first embodiment. The tile-type image data represents the result of image data rasterizing into pixels.

FIG. 4 shows an example of an A4-size page 41 at 600 dpi. The A4-size page 41 is segmented into tiles 42 each of 32×32 pixels. One page is formed from 220×156=34,320 tiles. For 1,200 dpi, one page is formed from 440×624=274,560 tiles.

<Example of Process Sequence of Span-Tile Sequence Conversion Process in First Embodiment>

FIG. 5 is a flowchart showing the process sequence of the span-tile sequence conversion process 201. The rendering unit 2060 executes this process. This process may also be achieved by software by a CPU which controls the rendering unit 2060, firmware using a state machine (to be described later), or a hardware circuit.

First, span information of a scan line of interest is acquired from, e.g., the external storage 2004 (S501). Then, the span information of the scan line of interest is stored in the intermediate buffer memory 202 (RAM 2002) (S502). It is determined whether scan lines corresponding to the height of one tile have been acquired (S503). If no span information corresponding to the height of one tile has been acquired, the next line is set as the line of interest (S504). Then, the sequence returns to input (S501) of the span of a scan line of interest.

If span lines corresponding to the height of one tile have been acquired, a tile of interest among the lines is set (S505). The start line of the tile of interest is set as the line of interest (S506). Span information corresponding to the line of interest in the tile of interest is read out from the intermediate buffer memory 202 (S507). Pieces of span information segmented by a width corresponding to a scan line in the tile of interest are generated and transmitted to the color filling process 103 in the tile sequence (S508). It is determined whether lines corresponding to the height of the tile of interest have been processed (S509). If lines corresponding to the height of the tile of interest have not been processed, the next line is set as the line of interest (S510). Then, the sequence returns to the process (S507) to read out span information of the line of interest in the tile of interest from the intermediate buffer memory 202.

If lines corresponding to the height of the tile of interest have been processed, it is determined whether tiles up to the final one in the main scanning direction (line direction) have been processed (S511). If tiles up to the final one in the main scanning direction have not been processed, the tile of interest shifts in the main scanning direction (S512). Then, the sequence returns to the process (S505) to set a tile of interest.

If tiles up to the final one in the main scanning direction have been processed, it is determined whether the entire page has been processed (S513). If no entire page has been processed, the line of interest is changed to the start of a tile line next to the processed one (S514). Then, the sequence returns to the process (S501) to acquire span information of the line of interest from the external storage 2004. If the entire page has been processed, the process ends.

<Concrete Example of Span-Tile Sequence Conversion Process in First Embodiment>

(Example of Span Information Before Span-Tile Sequence Conversion Process)

FIG. 6A is a view showing an example of the format of span information in the first embodiment. FIG. 6B is a schematic view showing an example of span information stored in the external storage 2004 in the format of FIG. 6A in the example of FIG. 2.

As shown in FIG. 6A, span information is formed from a pair of edge information. One edge information includes at least priority information, current X coordinate, and edge direction flag. " " represents a left edge which shows a start ob a background or an object, and " " represents a light edge which shows a end of the background or the object.

FIG. 6B shows span information in the example of FIG. 2.

Since line 0 contains only the background, span information made up of a pair of right and left edges of the page is generated. Line 0 corresponds to scan line A.

Line N represents span information corresponding to scan line BCD on which the red and rectangle object 602 is rasterized. From the left, line N is made up of the left edge of the page, the left edge of the red and rectangle object 602, the right edge of the red and rectangle object 602, and the right edge of the page.

As shown in FIG. 6B, span information has a data amount which differs between scan lines. In the first embodiment, pieces of line information with different data amounts are filled with no gap in successive areas of the memory.

(Example of Operation of Span-tile Sequence Conversion Process)

FIG. 7 is a schematic view showing span information in the intermediate buffer memory 202 (RAM 2002) during the span-tile sequence conversion process. FIG. 7 shows the correspondence with respective steps in FIG. 5.

Reference numeral 70 denotes the same page as those processed in FIGS. 2 and 3. In this example, the page is segmented into 4×6=24 tiles for descriptive convenience.

Reference numeral 71 denotes start tile lines of span information that are stored in the external storage 2004. By repeating step S501 in FIG. 5, the start tile lines of the span information are acquired from the span information in FIG. 6B. Reference numeral 72 denotes start tile lines of the span information that are stored in the RAM 2002 serving as the intermediate buffer memory 202 by repeating step S501 in FIG. 5. Reference numeral 73 denotes start tile lines of the span information that are also stored in the RAM 2002. By repeating step S507 in FIG. 5, pieces of span information are read out from the RAM 2002 in the tile sequence.

Reference numeral 74 denotes a process in a span-tile sequence conversion process execution unit in the rendering unit 2060. By repeating step S508 in FIG. 5, pieces of span information read out from the RAM 2002 are segmented by the tile width. The segmented pieces of span information are transmitted to the color filling process 103 in the tile sequence, as represented by reference numeral 75.

In the span-tile sequence conversion process 201, to acquire pieces of span information from the intermediate buffer memory 202 in the tile sequence, pieces of address information of scan lines in the height of a tile of interest for the current span of interest are held by the number of scan lines in the tile of interest. Every time span information of a tile of interest is generated, the address information is updated.

(Span Information after Span-Tile Sequence Conversion Process)

FIG. 8 is a schematic view showing pieces of span information after tile segmentation that are converted into the tile sequence by the span-tile sequence conversion process 201 and output to the color filling process 103. Pieces of span information after tile segmentation are transmitted to the color filling process 103 in the tile sequence.

Scan lines 0 to 7 contain only the background, and each of them is segmented into pieces of span information formed from the right and left edges of a tile of interest. Span information of scan line 0 in tile 0 and that of scan line 0 in tile 1 are generated by segmenting span information of scan line 0 in FIG. 6B.

Scan line N in FIG. 6B is a scan line from which the object 602 starts. Scan line N corresponds to scan line 1 in tile m, and tile m corresponds to the upper left corner of the object 602. Scan line 1 in tile m contains span information of the background and that of the object 602. Scan line 1 in tile m+1 contains only span information of the object 602.

<Example of Circuit Arrangement of Span-Tile Sequence Conversion Process in First Embodiment>

Figure 9A:
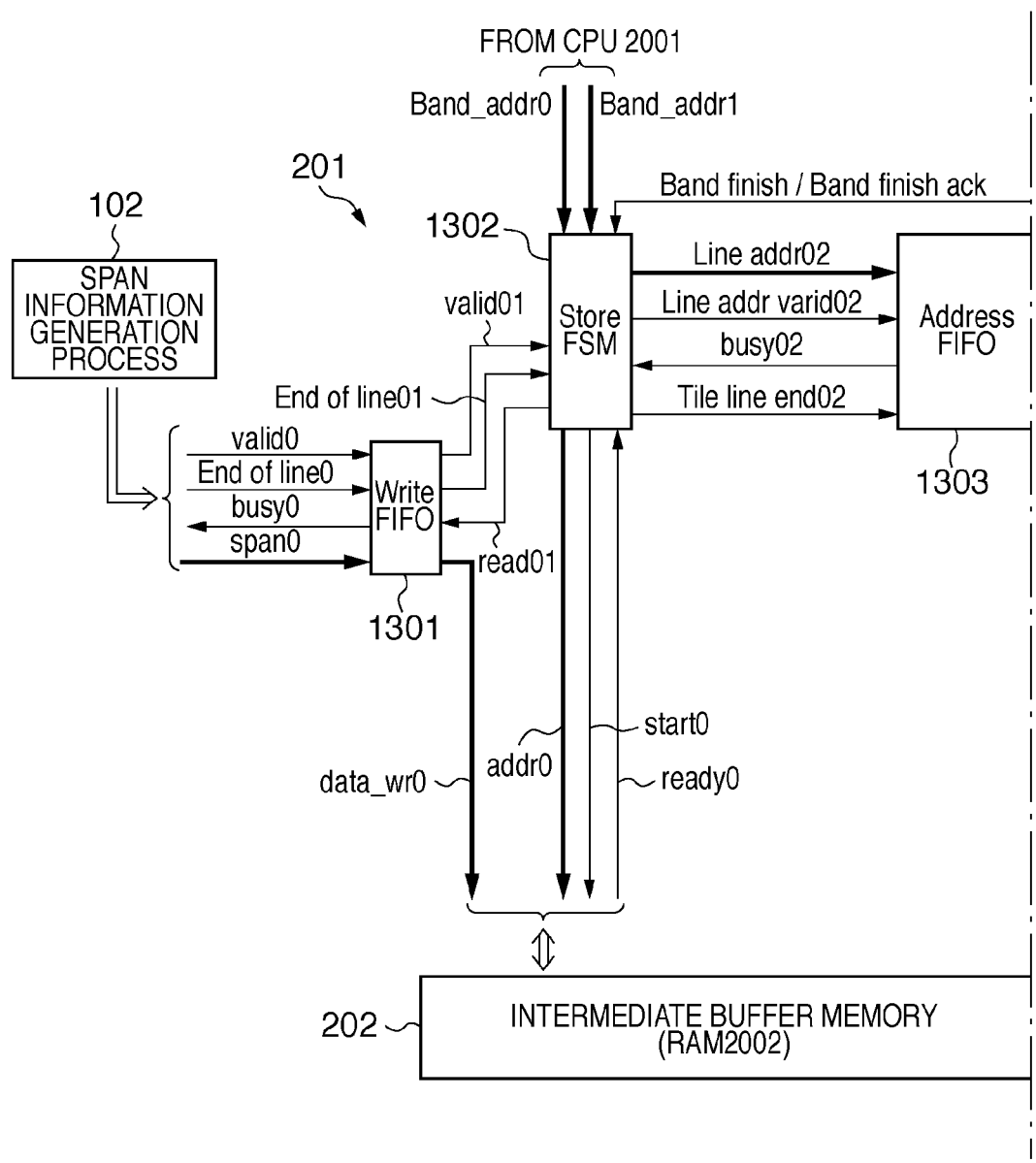
FIGS. 9A and 9B are a block diagram showing an example of a circuit arrangement for implementing the span-tile sequence conversion process in the first embodiment.
Figure 9B:
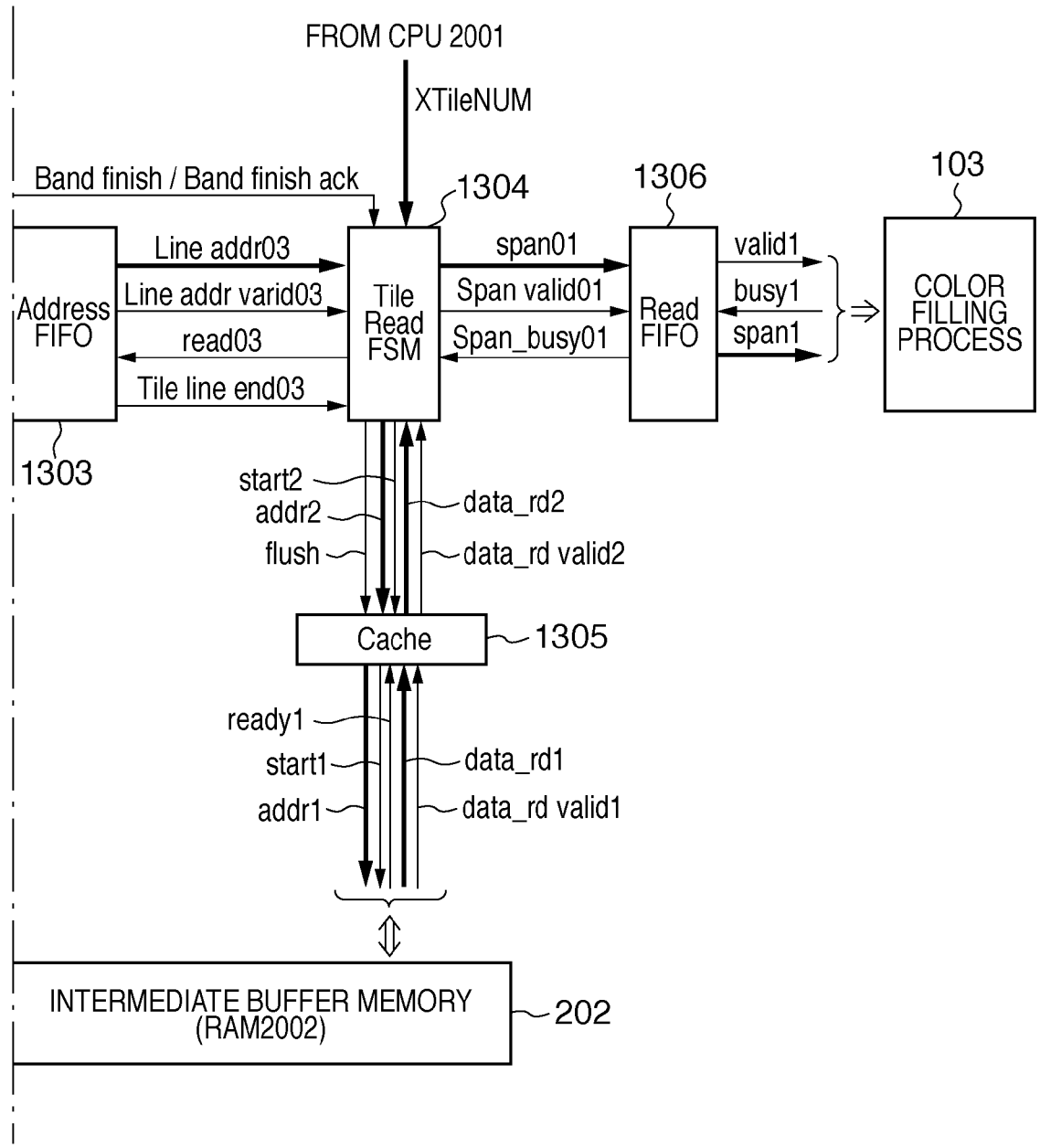

FIGS. 9A and 9B are a block diagram showing an example of a circuit arrangement for implementing the span-tile sequence conversion process 201. In FIGS. 9A and 9B, "FIFO" represents a first-in first-out buffer, "FSM" represents a state machine having a specific function, and "Cache" represents a cache memory.

A Write FIFO 1301 (FIG. 9A) receives span information in the scan sequence from the span information generation process 102, and notifies a Store FSM 1302 (FIG. 9A) by a valid01 signal that valid span information has been received. When valid span information is stored in the Write FIFO 1301, the Store FSM 1302 issues a write transaction to the intermediate buffer memory 202 that starts upon output of a start0 signal. Then, the Store FSM 1302 saves the span information in the intermediate buffer memory 202.

The Store FSM 1302 detects the start of a line by detecting output of an End of line01 signal. Then, the Store FSM 1302 sends, to an Address FIFO 1303 (FIGS. 9A and 9B), an address where start span information of a scan line is saved in the intermediate buffer memory 202. When the Store FSM 1302 detects that pieces of span information corresponding to the height of one tile have been written in the intermediate buffer memory 202, it sends a Tile line end02 signal to the Address FIFO 1303.

A Tile Read FSM 1304 (FIG. 9B) acquires the start address of pieces of span information of scan lines stored in the Address FIFO 1303. The pieces of span information corresponding to the height of one tile that are stored in the Tile Read FSM 1304 are sequentially stored in an address register in which they are addressed. When the Tile Read FSM 1304 detects the end of the tile line from output of a Tile line end03 from the Address FIFO 1303, it reads the pieces of span information stored in the intermediate buffer memory 202 from addresses where they are stored.

When the Tile Read FSM 1304 reads the pieces of span information from the intermediate buffer memory 202, a Cache 1305 (FIG. 9B) caches them read from the intermediate buffer memory 202 in association with addresses. In memory access by the Tile Read FSM 1304, the same span information is highly likely read even in read of the next tile. Thus, data cached in the Cache 1305 is highly likely hit.

The Tile Read FSM 1304 segments the pieces of span information of scan lines, which have been read from the intermediate buffer memory 202 via the Cache 1305, into the span of the tile of interest, and outputs the segmented span information to a Read FIFO 1306 (FIG. 9B). The Read FIFO 1306 transmits the span information in the tile to the color filling process 103.

(Example of Operation of Store FSM 1302)

Figure 10A:
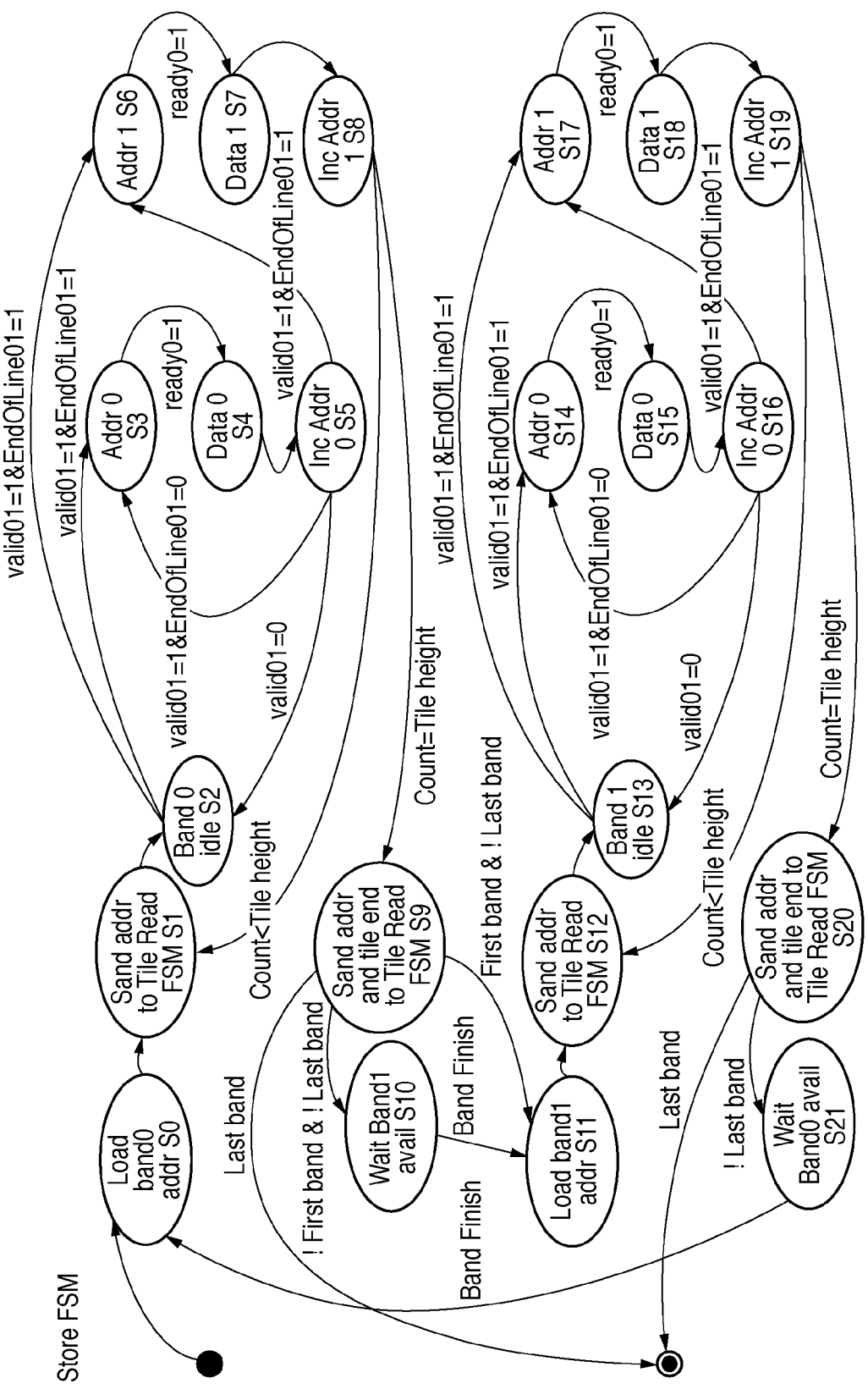
FIG. 10A is a state transition view showing the state transition of a Store FSM 1302 which builds the circuit of FIG. 9A.

FIG. 10A is a state transition view showing implementation of the Store FSM 1302. FIG. 10B is a table showing an output signal in each state (State Sx) of the Store FSM 1302 and the status of an internal register.

The Store FSM loads the start address (Band.addr0) of band 0 to the internal register (S0). Then, the Store FSM transmits the start address as the start address of the first scan line to the Tile Read FSM 1304 via the Address FIFO 1303 (S1).

The Store FSM 1302 checks from valid01 whether valid span data is stored in the Write FIFO 1301 (S2). If valid span data is stored, the Store FSM 1302 outputs an address signal in order to write the span data in the intermediate buffer memory 202 (S3). The Store FSM 1302 writes the data in the memory, and reads out one data from the Write FIFO 1301 (S4). The Store FSM 1302 increments a write address stored in the internal register (S5). If no valid data is saved in the Write FIFO 1301 yet, the Store FSM 1302 changes to an idle state (S2). If valid data is saved, the Store FSM 1302 changes to the next address phase (S3). By repeating S3-S4-S5-(S2)-S3 . . . , span information of one line is generated.

If the valid data corresponds to the end of the line (End of line01) in (S2), the Store FSM 1302 changes to the final address phase of the line (S6). The Store FSM 1302 writes the final data of the line in the memory (S7), and increments address information and the tile line count which are stored in the internal register (S8). If no tile line counter has reached the height of one tile, the Store FSM 1302 transmits the incremented address as the start address of the next line to the Tile Read FSM 1304 via the Address FIFO 1303 (S1).

If the tile line counter has reached the height of one tile, the Store FSM 1302 transmits information (Tile line end02) representing the end of the tile to the Tile Read FSM 1304 via the Address FIFO 1303 (S9). If the current band is not the first one, the Store FSM 1302 waits for output of a band finish signal (Band finish) from the Tile Read FSM 1304 (S10), and loads the start address of band 1 (S11). If the current band is the first one, the Store FSM 1302 directly loads the start address of band 1 without waiting for output of the band finish signal (Band finish) from the Tile Read FSM 1304 (S11).

Then, the Store FSM 1302 transmits the start address (Line addr02) as the start address of the first scan line to the Tile Read FSM 1304 via the Address FIFO 1303 (S12). Processes in S12 to S19 are the same as those in S1 to S8 except that the band changes.

The Store FSM 1302 checks whether valid span data is stored in the Write FIFO 1301 (S13). If valid span data is stored, the Store FSM 1302 outputs an address signal in order to write the span data in the intermediate buffer memory 202 (S14). The Store FSM 1302 writes the data in the memory, and reads out one data from the Write FIFO 1301 (S15). The Store FSM 1302 increments a write address stored in the internal register (S16). If no valid data is saved in the Write FIFO 1301 yet, the Store FSM 1302 changes to an idle state (S13). If valid data is saved, the Store FSM 1302 changes to the next address phase (S14). If the valid data corresponds to the end of the line in (S13), the Store FSM 1302 changes to the final address phase of the line (S17). The Store FSM 1302 writes the final data of the line in the memory (S18), and increments address information and the tile line count which are stored in the internal register (S19). If no tile line counter has reached the height of one tile, the Store FSM 1302 transmits the incremented address as the start address of the next line to the Tile Read FSM 1304 via the Address FIFO 1303 (S12).

If the tile line counter has reached the height of one tile in (S19), the Store FSM 1302 transmits information representing the end of the tile to the Tile Read FSM 1304 via the Address FIFO 1303 (S20). If the current band is the final one, the Store FSM 1302 ends the sequence. If the current band is not the final one, the Store FSM 1302 waits for output of a band finish signal from the Tile Read FSM 1304 (S21), and loads the start address of band 0 (S0). These processes are repeated.

In this way, the Store FSM 1302 reads out data of two tile lines in the sub-scanning direction by the processes of double buffers (BAND0 and BAND1), thereby increasing the speed of the span-tile sequence conversion process.

(Example of Operation of Tile Read FSM 1304)

Figure 11A:
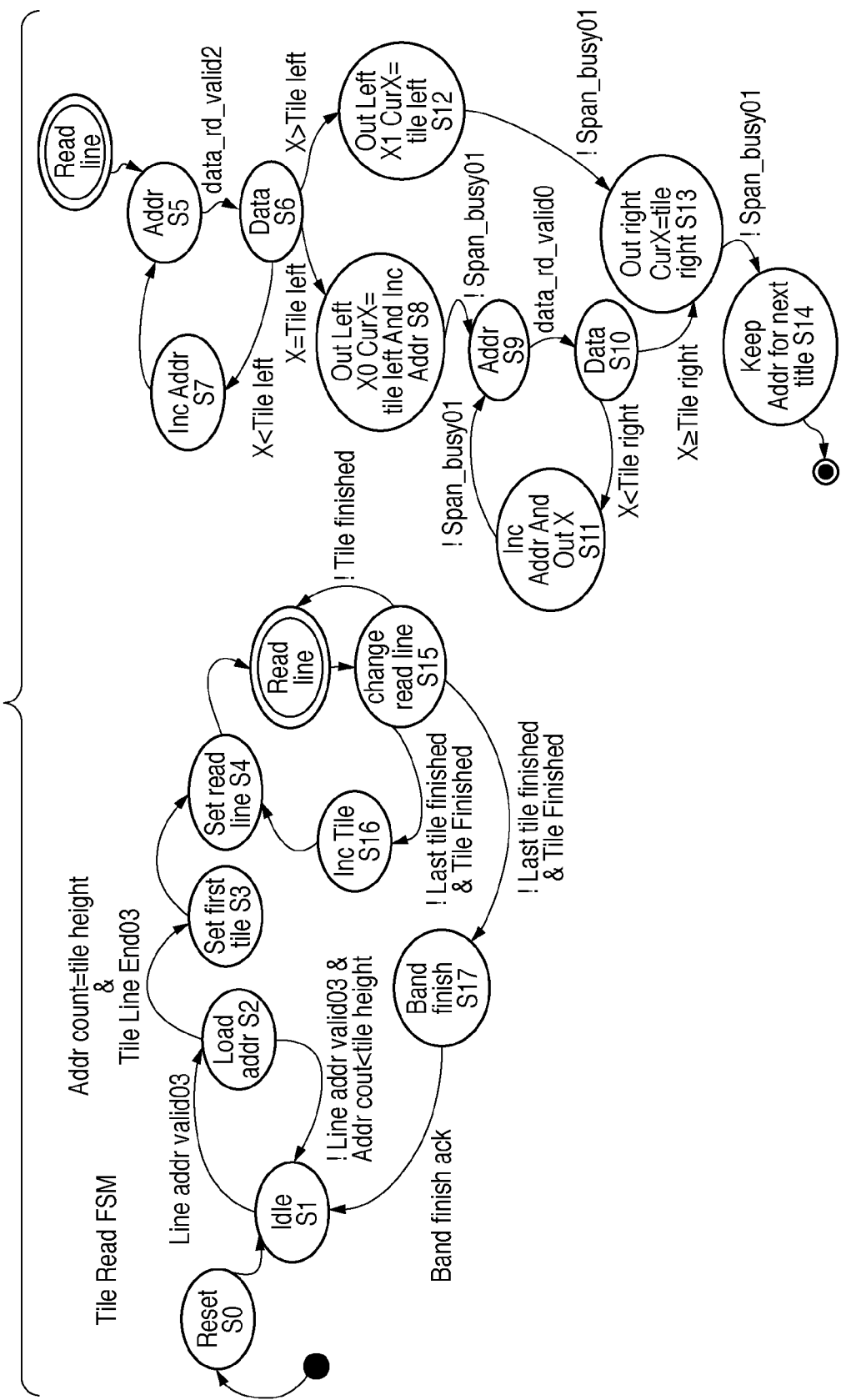
FIG. 11A is a state transition view showing the state transition of a Tile Read FSM 1304 which builds the circuit of FIG. 9B.

FIG. 11A is a state transition view showing implementation of the Tile Read FSM 1304. FIGS. 11B-11D are a table showing an output signal in each status (State Sx) of the Tile Read FSM 1304 and the status of an internal register.

First, the Tile Read FSM 1304 initializes the value of the internal register (S0). Then, the Tile Read FSM 1304 waits for output of a LineAddrValid03 signal from the Store FSM 1302 via the Address FIFO 1303 (S). If the LineAddrValid03 signal is output, the Tile Read FSM 1304 loads the start address (Line addr03) of a line to the internal register (S2). If the Tile Read FSM 1304 has not received the start addresses of lines by the number of lines in one tile, it returns to an idle state (S1), and repeats loading (S2) of the start address of a line.

If the Tile Read FSM 1304 has received start addresses by the number of lines in one tile, it sets, for the first tile, a tile counter in the main scanning direction in the internal register (S3). The Tile Read FSM 1304 sets a line to be read from the intermediate buffer memory 202 (S4).

The status changes to (S5) on the right side of FIG. 11A. The Tile Read FSM 1304 issues the address of the first span data of the line (S5), and acquires span data from the intermediate buffer memory 202 via the Cache 1305 (S6). If the X coordinate of the acquired span data is smaller than that of the left edge of the tile of interest in (S6), the Tile Read FSM 1304 increments the address (S7), issues the address again (S5), and acquires the next span data (S6).

If the X coordinate of the acquired span data is equal to that of the left edge of the tile of interest in (S6), the Tile Read FSM 1304 outputs the X coordinate of the left edge of the tile as the first information of span data in the tile, and increments the address (S8). The Tile Read FSM 1304 issues the address (S9), and acquires span data from the intermediate buffer memory 202 from the Cache 1305 (S10). If the X coordinate of the acquired span data is smaller than that of the right edge of the tile of interest, the Tile Read FSM 1304 increments the address (S11), and issues the address again (S9). If the X coordinate of the acquired span data is equal to or larger than that of the right edge of the tile of interest in (S10), the Tile Read FSM 1304 outputs the X coordinate of the right edge of the tile as the right edge of span data in the tile (S13).

If the X coordinate of the acquired span data is larger than that of the left edge of the tile of interest in (S6), the Tile Read FSM 1304 outputs the X coordinate of the left edge of the tile as the left edge of span data in the tile (S12). The Tile Read FSM 1304 outputs the X coordinate of the right edge of the tile as the right edge of span data in the tile (S13).

The Tile Read FSM 1304 saves the updated current address as the address of interest of the line of interest in the tile in an internal register associated with the line of interest (S14). Then, the status returns to the process on the left side of FIG. 11A.

The Tile Read FSM 1304 updates the line of interest by switching the current address to the address of interest of the next line that is saved in the internal register (S15). If the updated line of interest is not the bottom of the tile, the process changes from (S15) to (S5). The Tile Read FSM 1304 issues the address, and starts reading span data of the next line (S5). If the updated line of interest is the bottom of the tile, the Tile Read FSM 1304 updates the tile of interest in the main scanning direction (S16), and sets the first line in the tile as the line of interest (S4). The Tile Read FSM 1304 issues the address, and starts reading span data (S5).

If the updated line of interest is the bottom of the tile in (S15), and the Tile Read FSM 1304 has read span data in the main scanning direction and ends the process of a rightmost tile in a tile to be segmented, the Tile Read FSM 1304 outputs a BandFinish signal (S17). The Tile Read FSM 1304 checks whether the next band buffer from the Store FSM 1302 has been prepared (Band finish ack). If the next band buffer has been prepared, the Tile Read FSM 1304 returns to an idle state (S1).

(Example of Operation Timing of Span-Tile Sequence Conversion Circuit)

Figure 12B:
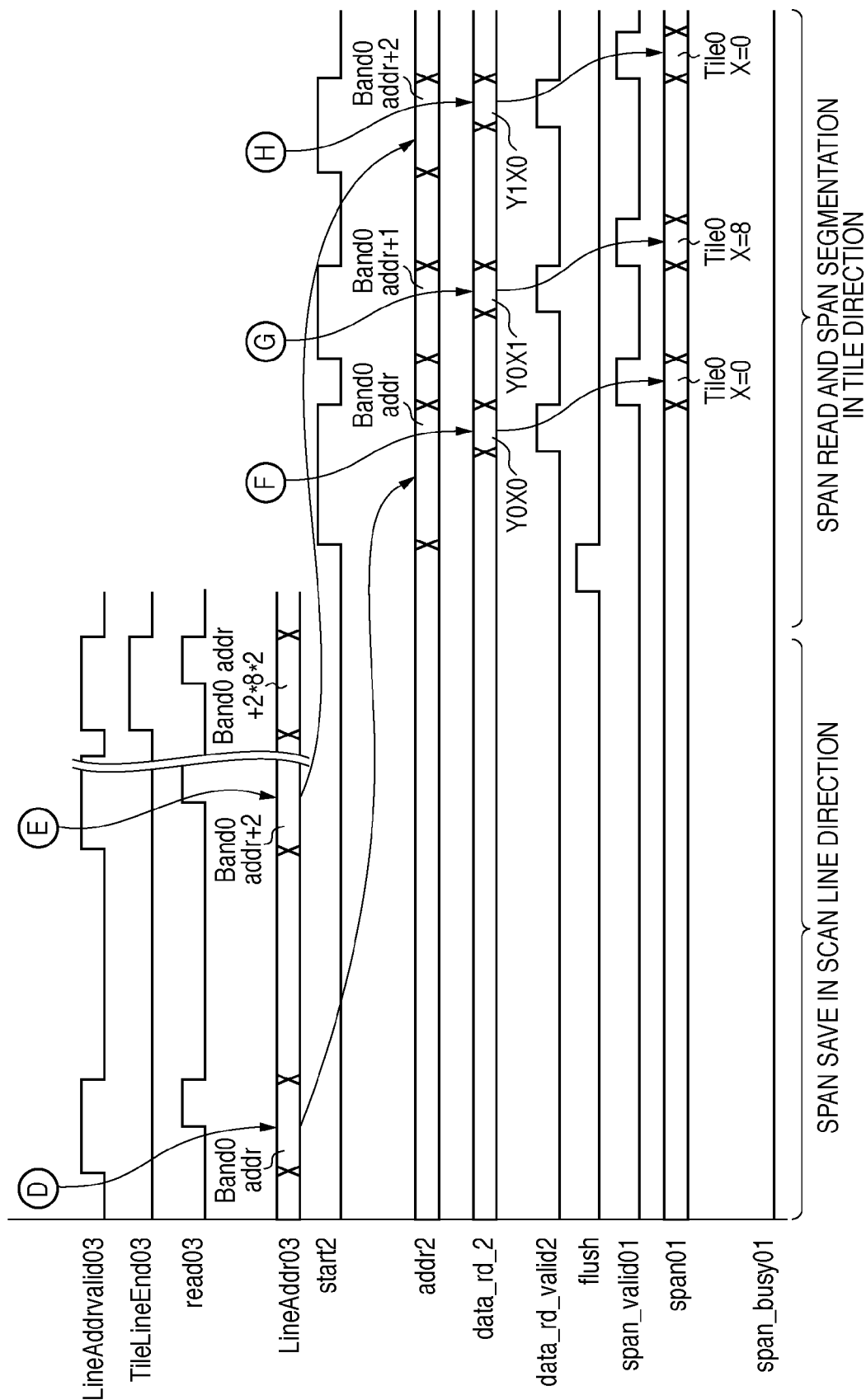

FIGS. 12A, 12B and 13 are waveform charts showing some behaviors of the span-tile sequence conversion circuit shown in FIGS. 9A to 11D that executes the span-tile sequence conversion process 201. "clk" represents a clock signal, and its attached numeral will be referred to as cycle n. Hence, FIG. 13 is a waveform chart subsequent to FIGS. 12A and 12B.

In cycle 1, the Store FSM 1302 outputs the start address of a band as the start address of a scan line. In cycle 2, the Write FIFO 1301 receives the first span data.

In cycle 3, the Write FIFO 1301 outputs a valid01 signal to the Store FSM 1302. In cycle 4, the Store FSM 1302 outputs a start0 signal to start a write transaction. The write transaction ends in cycles 4 and 5. Since the Write FIFO 1301 has already received the next span data, the Store FSM 1302 issues the next write transaction in cycles 7 and 8.

To detect the end of a line by an End of line01 signal, the Store FSM 1302 sets the start address of the next line in Line addr02, and transmits it to the Address FIFO 1303 in cycle 9. Storage of span data in the scan line direction continues in this manner. For the final line of the tile, the Store FSM 1302 outputs a Tile line end02 signal, and this signal serves as a Tile line end03 signal via the Address FIFO 1303.

In response to the Tile line end03 signal, the Tile Read FSM 1304 outputs a flush signal to initialize the Cache 1305 in cycle 14. Then, the Tile Read FSM 1304 issues a read transaction from the start address of a line in the tile. As represented by cycles 15 to 20, the Tile Read FSM 1304 acquires span data from the intermediate buffer memory 202 via the Cache 1305. The span data is obtained by reading span data which has been stored in the intermediate buffer memory 202 in cycles 4 and 5.

The Tile Read FSM 1304 segments the read span data of the scan line into span data in the tile. In cycles 18 and 21, the Tile Read FSM 1304 outputs the segmented span data in the tile to the Read FIFO 1306.

By repeating output of segmented span data in the tile, the Tile Read FSM 1304 outputs the final span data of the final line in the tile in cycles 31 and 32. Then, the Tile Read FSM 1304 shifts the tile of interest by one in the main scanning direction, and reads span data of scan lines again from cycle 36.

The Tile Read FSM 1304 repeats the processes in cycles 14 to 32 till the end of processing tiles in the main scanning direction. After the end of processing tiles in the main scanning direction, the process shifts to the next tile (prepared as Band1) in the sub-scanning direction. These processes are repeated until all the tiles of the page have been processed.

<Example of Operation of Image Processing Apparatus According to Second Embodiment>

Figure 14:
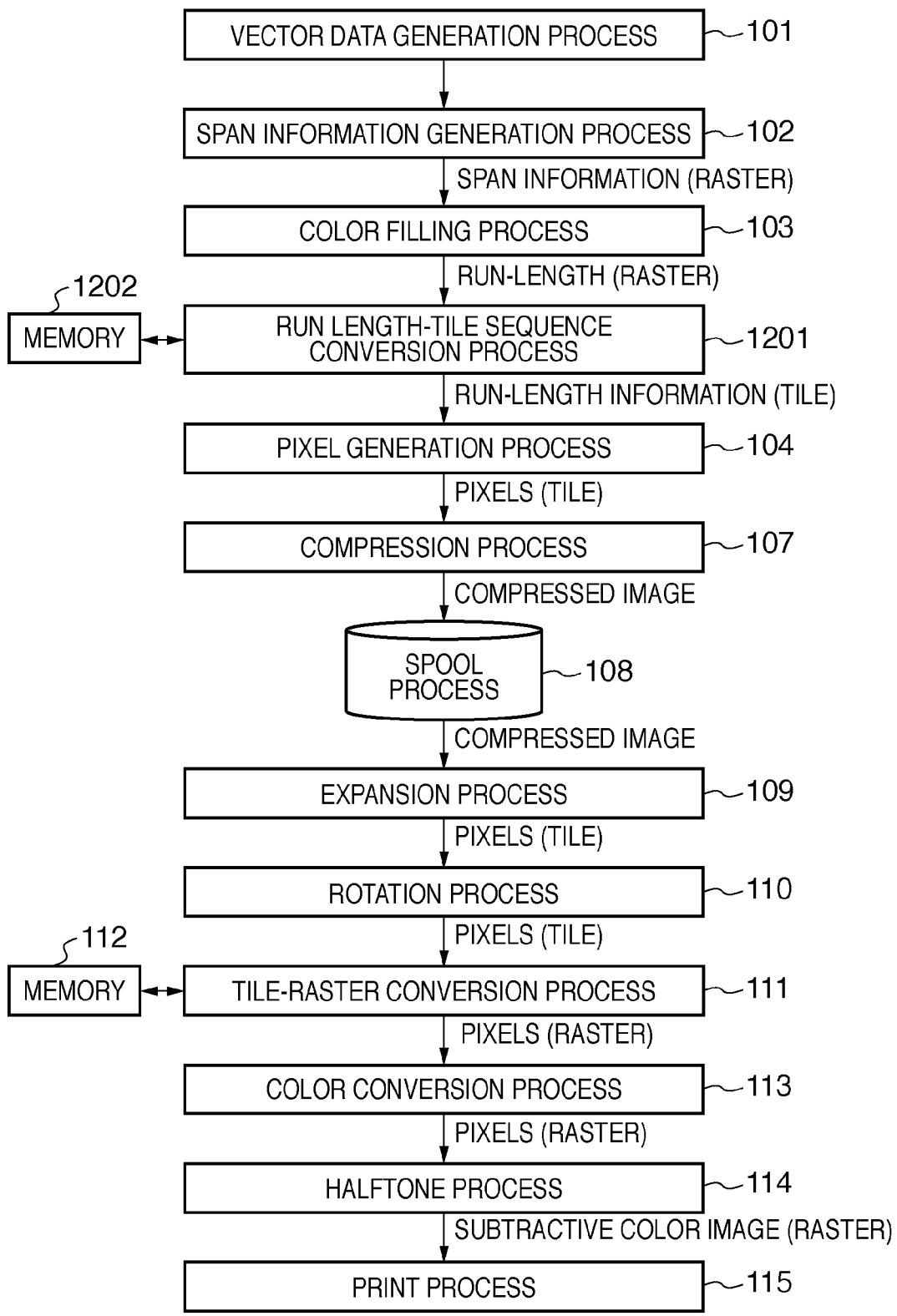
FIG. 14 is a flowchart showing an example of a process sequence in the second embodiment.

FIG. 14 is a data process flowchart showing the process sequence of page description language printing in the second embodiment. In the first embodiment, span information generated by the span information generation process 102 is converted into the tile sequence. In the second embodiment, run-length information after a color filling process is converted into the tile sequence.

A vector data generation process 101 is performed to generate display list-type vector data from a page description language. Then, a span information generation process 102 is performed to convert display list data into pieces of span information of respective scan lines. The generated pieces of span information of respective scan lines are assigned the color of each span by a color filling process 103. For a flat span, color information and repeat information are generated. For the span of an object whose color differs between pixels, such as an image, run-length information of a scan line formed from the run length of pieces of color information of pixels is generated. In the second embodiment, the pieces of run-length information of respective scan lines serve as input information to a run length-tile sequence conversion process 1201.

In the second embodiment, the pieces of run-length information of respective scan lines are temporarily stored in an intermediate buffer memory 1202 by the run length-tile sequence conversion process 1201. The stored pieces of run-length information of respective scan lines are read out in the tile sequence, and output to a pixel generation process 104 as pieces of run-length information segmented by the tile width. In the second embodiment, the pieces of run-length information segmented by the tile width serve as output information from the run length-tile sequence conversion process 1201.

The pieces of run-length information of respective tile lines are converted into pieces of pixel information by the pixel generation process 104. The pieces of pixel information are output as pieces of pixel information in the tile sequence.

As described above, the intermediate buffer memory 1202 is reserved as a partial area in a RAM 2002 serving as a main memory. A rendering unit 2060 accesses the area of the intermediate buffer memory 1202 in the RAM 2002 via a system bus bridge 2007 and RAM controller 2124. A rendering unit 2060 implements processes from the span information generation process 102 including the run length-tile sequence conversion process 1201 to the pixel generation process 104.

Then, similar to the prior art, a compression process 107 is executed, and a page of the compressed raster images (also called compressed data) in the tile sequence is spooled in an external storage 2004 of FIG. 16A by a spool process 108. A tile expansion unit 2103 in FIG. 16B performs an expansion process 109 for the page image spooled in the external storage 2004 of FIG. 16A by the spool process 108. An image rotation unit 2030 and the like perform a rotation process 110 and the like for the expanded data via a tile bus 2107. Image output interfaces 2113, 2151, 2152, and 2153 perform tile-raster conversion for the expanded tile-type pixel data having undergone the rotation process and the like. Image processing units 2115, 2154, 2155, and 2156 for a printer execute a color conversion process 113 and halftone process 114. A printer 2095 performs a print process 115.

A tile-raster conversion process 111 requires an intermediate memory 112 corresponding to the height of a tile. The image output interfaces 2113, 2151, 2152, and 2153 use a partial area in an image memory 2123 via a memory bus 2108.

(Concrete Example of Conversion into Tile Sequence in Second Embodiment)

Figure 15:
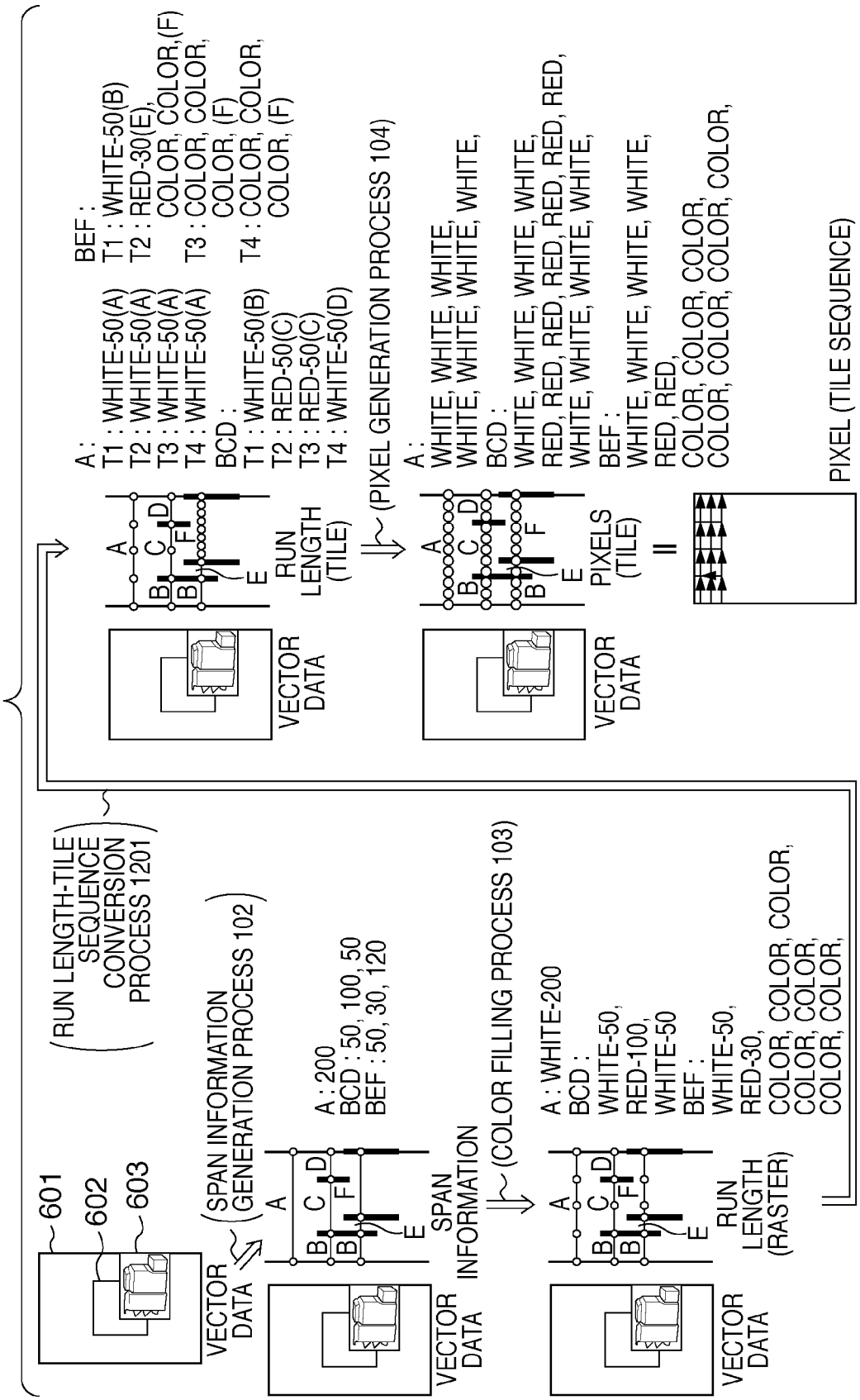
FIG. 15 is a schematic view showing a concrete example of a data process in the second embodiment.

FIG. 15 is a schematic view showing an example of processed data obtained by the vector data generation process 101 to the pixel generation process 104 in the process sequence of the second embodiment shown in FIG. 14. A comparison with FIG. 18 showing the prior art will clarify the operation effects of the present invention. To clarify a difference from the prior art, a background 601, red and rectangle object 602, and image 603 are identical to those in FIG. 18.

Vector data represented by the first stage of FIG. 15 is generated by the vector data generation process 101.

The generated vector data is converted into span information represented by the second stage of FIG. 15 by the span information generation process 102. Span A contains only the background, and ranges from the right to left edges of a page. Scan line BCD contains the red and rectangle object 602. For scan line BCD, span B of the background, span C of the red and rectangle object, and span D of the background are generated. Scan line BEF contains the red and rectangle object 602 and image 603. For scan line BEF, span B of the background, span E of the red and rectangle object 602, and span F of the image 603 are generated.

Then, as represented by the third stage of FIG. 15, the color filling process 103 is executed for span information of each scan line, generating run-length information.

As represented by the fourth stage of FIG. 15, run-length information of each scan line is converted into run-length information of a scan line in each tile by the run length-tile sequence conversion process 1201 according to the second embodiment.

Scan line A is segmented into four tiles T1, T2, T3, and T4. Run-length information of span A ranging from the right to left edges of the page because span A corresponds to the background is segmented into four pieces of run-length information by the tile width.

Run-length information of scan line BCD is also segmented into four tiles T1, T2, T3, and T4. Run-length information of scan line BCD before conversion into tiles includes three pieces of run-length information of spans B, C, and D in accordance with the background and the red and rectangle object. Upon segmentation, the tile T1 corresponds to run-length information of span B, the tile T2 corresponds to run-length information of a former segmented span of span C, the tile T3 corresponds to run-length information of a latter segmented span of span C, and the tile T4 corresponds to run-length information of span D.

Run-length information of scan line BEF is also segmented into four tiles T1, T2, T3, and T4. Run-length information of scan line BEF before conversion into tiles includes three pieces of run-length information of spans B, E, and F in accordance with the background, the red and rectangle object, and the image object. Upon the segmentation, the tile T1 corresponds to run-length information of span B, the tile T2 corresponds to run-length information of span E and that of a former segmented span of span F, the tile T3 corresponds to run-length information of an intermediate segmented span of span F, and the tile T4 corresponds to run-length information of a latter segmented span of span F.

As represented by the fifth stage of FIG. 15, pieces of pixel information are generated from the run-length information by the pixel generation process 104.

In the second embodiment, pieces of pixel information in the tile sequence are completed at the end of the pixel generation process 104, as represented by the last stage of FIG. 15.

A circuit arrangement for implementing the run length-tile sequence conversion process 1201 in the second embodiment will readily occur to those skilled in the art as long as the circuit examples shown in FIGS. 9A to 13 in the first embodiment are disclosed.

<Other Embodiment>

The above-described embodiment has described in detail circuit examples using a state machine which implements the span-tile sequence conversion process 201. However, the span-tile sequence conversion process 201 in the present invention can be achieved by any circuit arrangement as long as processes complying with the flowchart shown in FIG. 5 can be executed.

In the above-described embodiments, the span-tile sequence conversion process 201 and run length-tile sequence conversion process 1201 are included in the rendering unit 2060 in FIG. 16A. However, these processes may also be executed by independent building elements. Alternatively, these processes may also be included in another building element or integrated in part of a larger building element.

In the above-described embodiments, tile-type pixel information as a result of the process undergoes a print process, but may also be used for a pixel information process such as a display process. The present invention proposes an arrangement which generates tile-type pixel information from a large amount of data while saving the resource. The present invention is applicable to a technique which requires this process.

The present invention may be applied to a system or integrated apparatus including a plurality of devices (e.g., a host computer, interface device, and printer) or an apparatus formed by a single device.

The object of the present invention is also achieved by supplying a storage medium (or recording medium) which stores software program codes for implementing the functions of the above-described embodiments to a system or apparatus, and reading out and executing the program codes stored in the storage medium by the computer (or the CPU or MPU) of the system or apparatus. In this case, the program codes read out from the storage medium implement the functions of the above-described embodiments, and the storage medium which stores the program codes constitutes the present invention. The functions of the above-described embodiments are implemented when the computer executes the readout program codes. In addition, the present invention includes a case wherein an OS (Operating System) or the like running on the computer performs some or all of actual processes on the basis of the instructions of the program codes and thereby implements the functions of the above-described embodiments.

Further, the present invention includes the following case. That is, the program codes read out from the storage medium are written in the memory of a function expansion card inserted into the computer or the memory of a function expansion unit connected to the computer. Then, the CPU of the function expansion card or function expansion unit performs some or all of actual processes on the basis of the instructions of the program codes, thereby implementing the functions of the above-described embodiments.

When the present invention is applied to the storage medium, the storage medium stores program codes corresponding to the above-described flowcharts.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-123897, filed May 9, 2008, which is hereby incorporated by reference herein in its entirety.

What is claimed is:

1. An image processing apparatus comprising:
a reception unit adapted to receive print instructing information from a host;
a first conversion unit adapted to convert the received print instructing information into intermediate information capable of a rendering process;
a second conversion unit adapted to convert the intermediate information into pieces of span information of respective scan lines;
a color filling unit adapted to assign a color to the pieces of span information of respective scan lines, thereby generating pieces of run-length information of respective scan lines, each of which includes color information and repeat information;
a generation unit adapted to generate pieces of pixel information in the tile sequence by rendering the pieces of run-length information;
a segmentation unit adapted to segment pieces of input information of respective scan lines into pieces of information of respective scan lines in tiles, thereby rearranging the pieces of input information into pieces of output information of respective tiles;
a compression unit adapted to perform a compression process for the pieces of pixel information in the tile sequence for each tile, thereby generating compressed data;
a storage unit adapted to store a page of compressed data of respective tiles; and
a printing unit adapted to perform a print process using the compressed data which are stored in said storage unit and compressed for each tile,
wherein said segmentation unit uses the pieces of span information of respective scan lines from said second conversion unit as the pieces of input information, segments the pieces of span information of respective scan lines into pieces of span information of respective scan lines in tiles to rearrange the pieces of span information of respective scan lines in tiles into pieces of span information of respective tiles, and outputs the rearranged pieces of span information of respective tiles as the pieces of output information to said color filling unit.

2. The apparatus according to claim 1, wherein said segmentation unit includes a storage unit adapted to store two tile lines of image data in a sub-scanning direction.

3. The apparatus according to claim 2, wherein said storage unit includes a main memory of the image processing apparatus.

4. The apparatus according to claim 1, wherein said segmentation unit outputs the rearranged pieces of span information of respective tiles serving as the pieces of output information to said color filling unit in a sequence of respective scan lines.

5. An image processing apparatus comprising:
a reception unit adapted to receive print instructing information from a host;
a first conversion unit adapted to convert the received print instructing information into intermediate information capable of a rendering process;
a second conversion unit adapted to convert the intermediate information into pieces of span information of respective scan lines;
a color filling unit adapted to assign a color to the pieces of span information of respective scan lines, thereby generating pieces of run-length information of respective scan lines, each of which includes color information and repeat information;
a generation unit adapted to generate pieces of pixel information in the tile sequence by rendering the pieces of run-length information;
a segmentation unit adapted to segment pieces of input information of respective scan lines into pieces of information of respective scan lines in tiles, thereby rearranging the pieces of input information into pieces of output information of respective tiles;
a compression unit adapted to perform a compression process for the pieces of pixel information in the tile sequence for each tile, thereby generating compressed data;
a storage unit adapted to store a page of compressed data of respective tiles; and
a printing unit adapted to perform a print process using the compressed data which are stored in said storage unit and compressed for each tile,
wherein said segmentation unit uses the pieces of color-assigned run-length information from said color filling unit as the pieces of input information, segments the pieces of color-assigned run-length information into pieces of run-length information of respective scan lines in tiles to rearrange the pieces of run-length information of respective scan lines in tiles into pieces of run-length information of respective tiles, and outputs the rearranged pieces of color-assigned run-length information of respective tiles as the pieces of output information to said generation unit.

6. The apparatus according to claim 5, wherein said segmentation unit includes a storage unit adapted to store two tile lines of image data in a sub-scanning direction.

7. The apparatus according to claim 6, wherein said storage unit includes a main memory of the image processing apparatus.

8. The apparatus according to claim 5, wherein said segmentation unit outputs the rearranged pieces of run-length information of respective tiles serving as the pieces of output information to said generation unit in a sequence of respective scan lines.

9. A method of controlling an image processing apparatus, comprising the steps of:
receiving print instructing information from a host;
first converting the received print instructing information into intermediate information capable of a rendering process;
second converting the intermediate information into pieces of span information of respective scan lines;
color filling by assigning a color to the pieces of span information of respective scan lines to generate pieces of run-length information of respective scan lines, each of which includes color information and repeat information;
generating pieces of pixel information in the tile sequence by rendering the pieces of run-length information;
segmenting pieces of input information of respective scan lines into pieces of information of respective scan lines in tiles to rearrange the pieces of input information into pieces of output information of respective tiles;
performing a compression process for the pieces of pixel information in the tile sequence for each tile, thereby generating compressed data;
storing a page of compressed data of respective tiles; and
performing a print process using the compressed data which are stored in a storage unit and compressed for each tile,
wherein in said segmenting step, the pieces of span information of respective scan lines that are converted in said second converting step are used as the pieces of input information and segmented into pieces of span information of respective scan lines in tiles to rearrange the pieces of span information of respective scan lines in tiles into pieces of span information of respective tiles, and the rearranged pieces of span information of respective tiles are output as the pieces of output information for said color filling step.

10. A non-transitory computer-readable storage medium storing a program for causing a computer to execute the steps of the method according to claim 9.

11. A method of controlling an image processing apparatus, comprising the steps of:
receiving print instructing information from a host;
first converting the received print instructing information into intermediate information capable of a rendering process;
second converting the intermediate information into pieces of span information of respective scan lines;
color filling by assigning a color to the pieces of span information of respective scan lines to generate pieces of run-length information of respective scan lines, each of which includes color information and repeat information;
generating pieces of pixel information in the tile sequence by rendering the pieces of run-length information;
segmenting pieces of input information of respective scan lines into pieces of information of respective scan lines in tiles to rearrange the pieces of input information into pieces of output information of respective tiles;
performing a compression process for the pieces of pixel information in the tile sequence for each tile, thereby generating compressed data;
storing a page of compressed data of respective tiles; and
performing a print process using the compressed data which are stored in a storage unit and compressed for each tile,
wherein in said segmenting step, the pieces of color-assigned run-length information from said color filling step are used as the pieces of input information and segmented into pieces of run-length information of respective scan lines in tiles to rearrange the pieces of run-length information of respective scan lines in tiles into pieces of run-length information of respective tiles, and the rearranged pieces of color-assigned run-length information of respective tiles are output as the pieces of output information for said generating step.

12. A non-transitory computer-readable storage medium storing a program for causing a computer to execute the steps of the method according to claim 11.

13. An image processing apparatus comprising:
a generation unit adapted to generate pieces of span information of respective scan lines on the basis of print instructing information from a host;
a span-tile sequence conversion unit adapted to convert the generated pieces of span information of respective scan lines into pieces of span information of respective scan lines in tiles;
a tile color filling unit adapted to generate pieces of run-length information of respective scan lines in tiles from the converted pieces of span information of respective scan lines in tiles;
a pixel generation unit adapted to generate pieces of pixel information in a tile sequence from the generated pieces of run-length information of respective scan lines in tiles;
a unit adapted to perform a compression process for the generated pieces of pixel information in the tile sequence and spool the compressed pieces of pixel information in a storage;
an expansion unit adapted to expand the compressed pieces of pixel information in the tile sequence that are spooled in the storage;
a tile-raster conversion unit adapted to convert the expanded pieces of pixel information in the tile sequence into pieces of pixel information of respective scan lines; and
a printing unit adapted to execute printing on the basis of the pieces of pixel information of respective scan lines.

14. An image processing apparatus comprising:
a generation unit adapted to generate pieces of span information of respective scan lines on the basis of print instructing information from a host;
a color filling unit adapted to generate pieces of run-length information of respective scan lines from the generated pieces of span information of respective scan lines;
a run length-tile sequence conversion unit adapted to generate pieces of run-length information of respective scan lines in tiles from the generated pieces of run-length information of respective scan lines;
a pixel generation unit adapted to generate pieces of pixel information in a tile sequence from the generated pieces of run-length information of respective scan lines in tiles;
a unit adapted to perform a compression process for the generated pieces of pixel information in the tile sequence and spool the compressed pieces of pixel information in a storage;
an expansion unit adapted to expand the compressed pieces of pixel information in the tile sequence that are spooled in the storage;
a tile-raster conversion unit adapted to convert the expanded pieces of pixel information in the tile sequence into pieces of pixel information of respective scan lines; and
a printing unit adapted to execute printing on the basis of the pieces of pixel information of respective scan lines.

* * * * *